US010889095B2

(12) United States Patent
Fukushima et al.

(10) Patent No.: US 10,889,095 B2
(45) Date of Patent: Jan. 12, 2021

(54) LAMINATION STRUCTURE AND A METHOD FOR MANUFACTURING THE SAME

(71) Applicant: Gifu Plastic Industry Co., Ltd., Gifu (JP)

(72) Inventors: Shinji Fukushima, Gifu (JP); Hirotaka Itou, Gifu (JP); Tatsuya Shinkai, Gifu (JP); Hiroki Ito, Gifu (JP)

(73) Assignee: Gifu Plastic Industry Co., Ltd., Gifu (JP)

(*) Notice: Subject to any disclaimer, the term of this patent is extended or adjusted under 35 U.S.C. 154(b) by 0 days.

(21) Appl. No.: 16/102,300

(22) Filed: Aug. 13, 2018

(65) Prior Publication Data

US 2018/0361726 A1    Dec. 20, 2018

Related U.S. Application Data

(62) Division of application No. 15/377,983, filed on Dec. 13, 2016, now Pat. No. 10,442,171.

(30) Foreign Application Priority Data

Dec. 17, 2015 (JP) .................... 2015-246653
Jan. 15, 2016 (JP) .................... 2016-006297
Apr. 26, 2016 (JP) .................... 2016-088518

(51) Int. Cl.
*B32B 3/12*    (2006.01)
*B32B 15/08*    (2006.01)
(Continued)

(52) U.S. Cl.
CPC ............. *B32B 37/146* (2013.01); *B32B 3/12* (2013.01); *B32B 3/266* (2013.01); *B32B 3/28* (2013.01);
(Continued)

(58) Field of Classification Search
CPC ..... B32B 37/146; B32B 3/30; B32B 2398/20; B32B 5/022; B32B 3/12; B32B 3/26;
(Continued)

(56) References Cited

U.S. PATENT DOCUMENTS 3,252,493 A * 5/1966 Smith .................. F16B 5/01
411/108
3,955,019 A    5/1976 Keith
(Continued)

FOREIGN PATENT DOCUMENTS

JP    S48-93673    12/1973
JP    S48-93873    12/1973
(Continued)

OTHER PUBLICATIONS

Walker "Honeycomb fastening." National Aeronautic and Space Engineering and Manufacturing Meeting Los Angeles, Calif. Oct. 5-9, pp. 1-11, access: https://apps.dtic.mil/dtic/tr/fulltext/u2/a305407.pdf (Year: 1970).*
(Continued)

*Primary Examiner* — Tri V Nguyen
(74) *Attorney, Agent, or Firm* — Schwegman Lundberg & Woessner, P.A.

(57) ABSTRACT

Metal plates are placed on opposed surfaces of two heating plates, the metal plates are heated. Then, a hollow plate is placed between the two heating plates, and the two heating plates are moved toward each other. The metal plates, which are heated to a high temperature, are bonded to the outer surfaces of the hollow plate by thermal fusion caused by the heat of the metal plates. After the metal plates are brought into planar contact with the hollow plate, the heating plates are moved away from each other. The heating plates sand-
(Continued)

wich the hollow plate only for a very short time. Thus, the heat of the heating plates is not transferred excessively to the hollow plate.

1 Claim, 15 Drawing Sheets

(51) Int. Cl.

| | | |
|---|---|---|
| B32B 5/02 | (2006.01) | |
| B32B 7/04 | (2019.01) | |
| B32B 15/14 | (2006.01) | |
| B32B 3/26 | (2006.01) | |
| B32B 3/28 | (2006.01) | |
| B32B 3/30 | (2006.01) | |
| B32B 37/14 | (2006.01) | |
| B32B 37/06 | (2006.01) | |
| B32B 37/00 | (2006.01) | |
| B32B 37/04 | (2006.01) | |
| B32B 7/12 | (2006.01) | |
| B32B 15/18 | (2006.01) | |
| B32B 15/20 | (2006.01) | |
| B32B 27/08 | (2006.01) | |
| B32B 27/12 | (2006.01) | |
| B32B 38/18 | (2006.01) | |

(52) U.S. Cl.
CPC ............... *B32B 3/30* (2013.01); *B32B 5/022* (2013.01); *B32B 7/04* (2013.01); *B32B 7/12* (2013.01); *B32B 15/08* (2013.01); *B32B 15/14* (2013.01); *B32B 15/18* (2013.01); *B32B 15/20* (2013.01); *B32B 27/08* (2013.01); *B32B 27/12* (2013.01); *B32B 37/003* (2013.01); *B32B 37/04* (2013.01); *B32B 37/06* (2013.01); *B32B 37/0015* (2013.01); *B32B 38/1858* (2013.01); *B32B 2250/05* (2013.01); *B32B 2250/40* (2013.01); *B32B 2307/3065* (2013.01); *B32B 2307/50* (2013.01); *B32B 2307/546* (2013.01); *B32B 2307/558* (2013.01); *B32B 2307/732* (2013.01); *B32B 2311/00* (2013.01); *B32B 2439/00* (2013.01); *B32B 2479/00* (2013.01); *B32B 2605/00* (2013.01)

(58) Field of Classification Search
CPC .. B32B 3/266; B32B 7/04; B32B 7/12; B32B 15/04; B32B 15/14
USPC .......................................... 428/116, 118, 120
See application file for complete search history.

(56) References Cited

U.S. PATENT DOCUMENTS

| 5,316,604 A | 5/1994 | Fell |
|---|---|---|
| 10,442,171 B2 | 10/2019 | Fukushima et al. |
| 2011/0095572 A1* | 4/2011 | Wary ........................ B32B 3/12 296/193.07 |
| 2015/0273787 A1* | 10/2015 | Nansen ..................... B32B 3/12 428/116 |
| 2017/0036750 A1* | 2/2017 | Lewis ........................ B64C 1/12 |
| 2017/0173935 A1 | 6/2017 | Fukushima et al. |
| 2018/0361725 A1 | 12/2018 | Fukushima et al. |

FOREIGN PATENT DOCUMENTS

| JP | S5252982 A | 4/1977 |
|---|---|---|
| JP | S53-15567 U | 2/1978 |
| JP | S56-116541 U | 9/1981 |
| JP | S59212245 A | 12/1984 |
| JP | H3-182342 U | 8/1991 |
| JP | 07279306 | 10/1995 |
| JP | 10-156985 A | 6/1998 |
| JP | 2001219435 | 8/2001 |
| JP | 2010-247448 A | 11/2010 |
| JP | 2013240965 A | 12/2013 |
| JP | 2016007900 A | 1/2016 |
| WO | WO-2014208210 A1 | 12/2014 |

OTHER PUBLICATIONS

U.S. Appl. No. 15/377,983, Final Office Action dated Feb. 7, 2019, 7 pgs.
U.S. Appl. No. 15/377,983, Response filed Jan. 24, 2019 to Non Final Office Action dated Nov. 1, 2018, 8 pgs.
Weber, "New techniques for joining plastic to metal", Assembly Magazine, 60th Anniversary Ed., (Sep. 3, 2014), 6 pgs.
"U.S. Appl. No. 15/377,983, Response filed May 7, 2019 to Final Office Action dated Feb. 7, 2019", 5 pgs.
"U.S. Appl. No. 15/377,983, Notice of Allowance dated May 22, 2019", 7 pgs.
"U.S. Appl. No. 15/377,983, Response Filed Aug. 9, 2018 to Restriction Requirement dated Jun. 13, 2018", 5 pgs.
"U.S. Appl. No. 15/377,983, Non Final Office Action dated Nov. 1, 2018", 6 pgs.
U.S. Appl. No. 15/377,983, Restriction Requirement dated Jun. 13, 2018, 6 pgs.
Japanese Patent Application No. 2016-088518, Notice of Reasons for Refusal dated Jan. 29, 2020, w/ English Translation, 14 pgs.
"Japanese Patent Application No. 2016-006297, Notice of Reasons for Refusal dated Aug. 19, 2019", w/ English Translation, 6 pgs.
"U.S. Appl. No. 15/377,983, Examiner Interview Summary dated Sep. 12, 2019", 3 pgs.
"U.S. Appl. No. 15/377,983, Corrected Notice of Allowability dated Sep. 16, 2019", 2 pgs.
"U.S. Appl. No. 16/102,285, Non Final Office Action dated Nov. 13, 2019", 8 pgs.
"Japanese Application Serial No. 2016-206391, Notice of Reasons for Refusal dated Sep. 8, 2020", w/ English Translation, 4 pgs.

\* cited by examiner

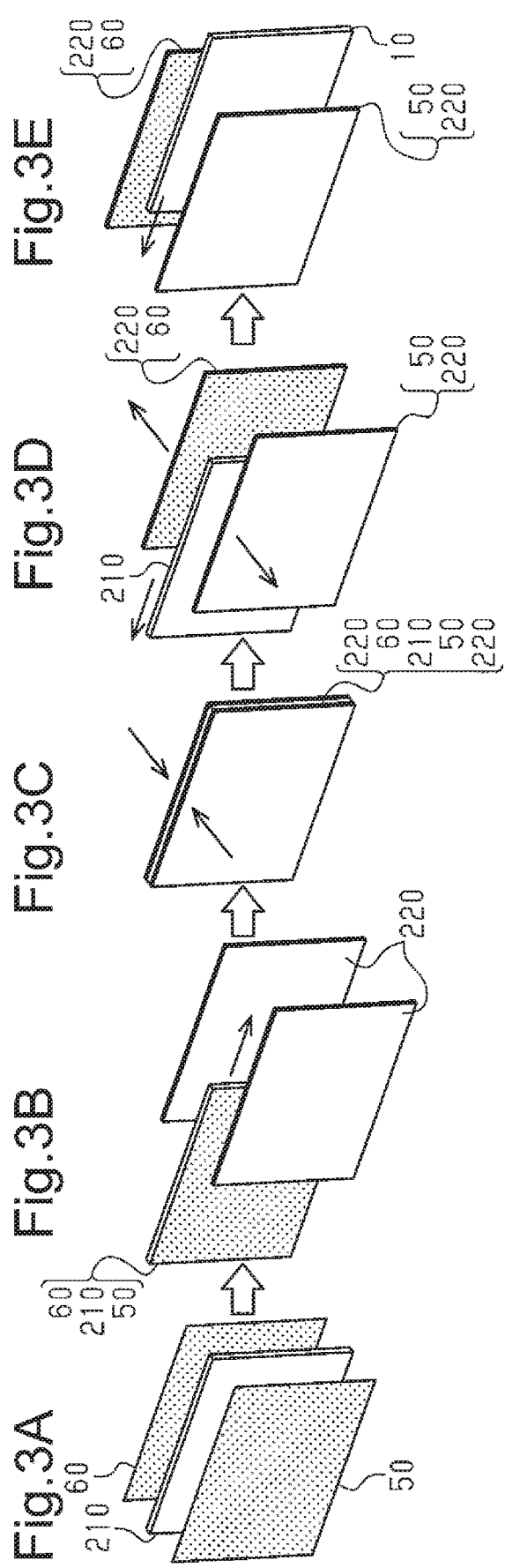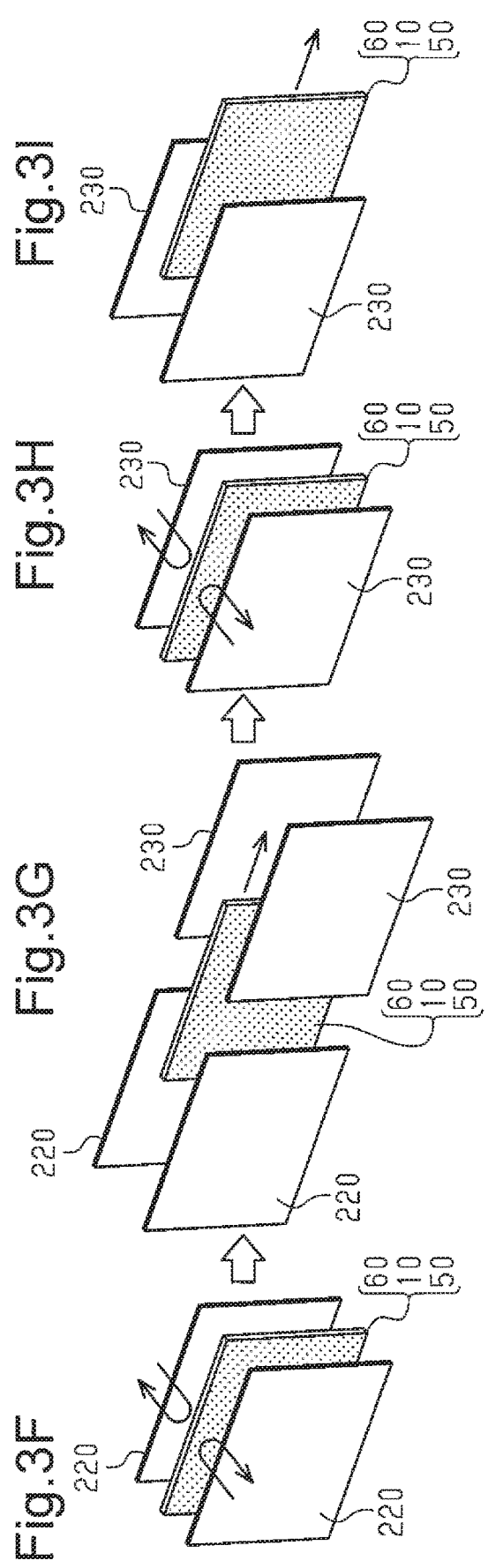

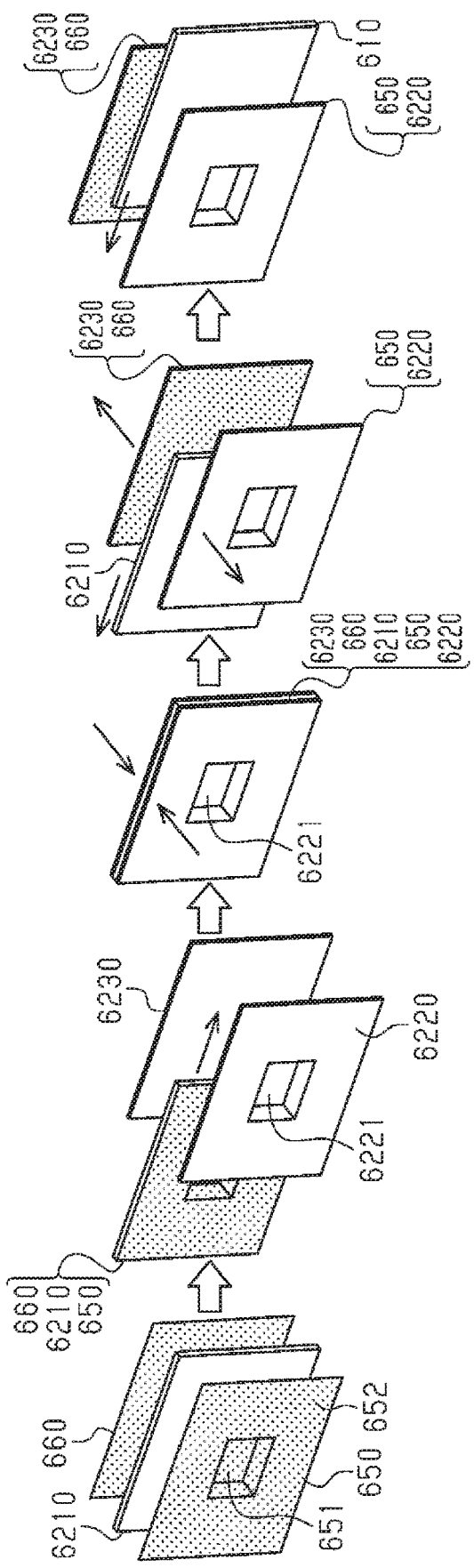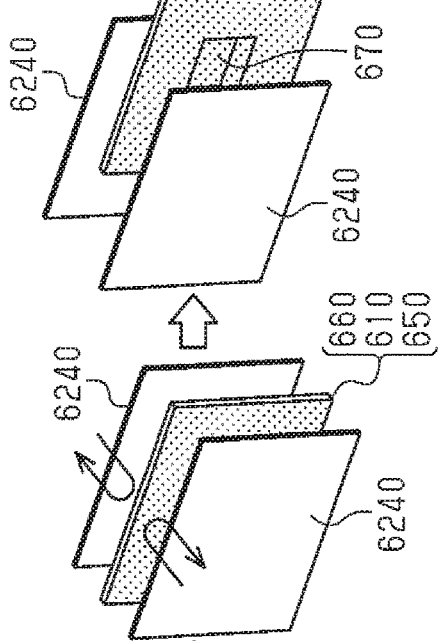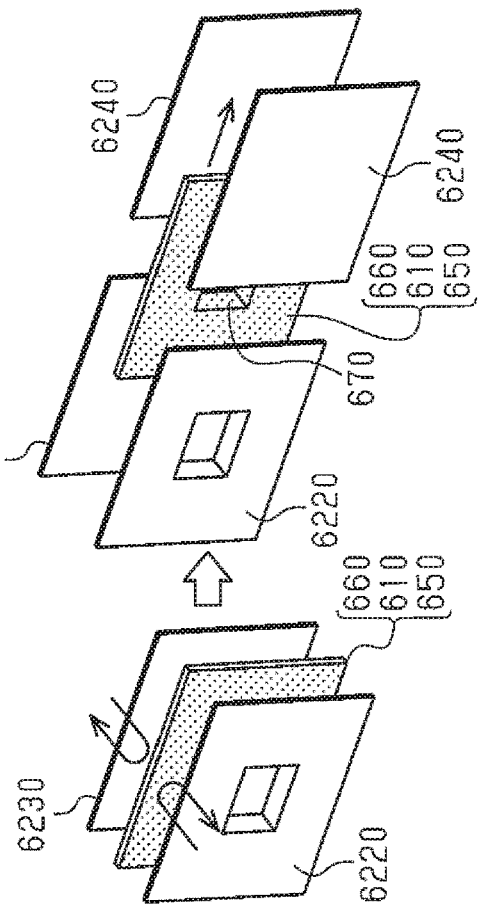

LAMINATION STRUCTURE AND A METHOD FOR MANUFACTURING THE SAME

CLAIM OF PRIORITY

This application is a divisional of and claims the benefit of priority under 35 U.S.C. § 120 to U.S. patent application Ser. No. 15/377,983, filed on Dec. 13, 2016, which claims the benefit of priority under 35 U.S.C. § 119 to Japanese Patent Application No. 2016-088518, filed on Apr. 26, 2016, and to Japanese Patent Application No. 2016-006297, filed on Jan. 15, 2016, and to Japanese Patent Application No. 2015-246653, filed on Dec. 17, 2015, each of which are incorporated by reference herein in its entirety.

BACKGROUND OF THE INVENTION

The present invention relates to a lamination structure including a hollow plate made of a thermoplastic resin and a metal plate bonded to the hollow plate, and to a method for manufacturing the lamination structure.

A conventional hollow plate is known that has a plurality of cells each having the shape of a polygonal or cylindrical column. For example, Japanese Laid-Open Patent Publication No. 2010-247448 describes a hollow plate including a core layer in which a plurality of cells each having the shape of a hexagonal column is arranged. The core layer is formed by folding a sheet member that is made of a thermoplastic resin and has a predetermined shape. A superficial layer, which is a sheet member made of a thermoplastic resin, is bonded to each of the upper and lower sides of the core layer. The hollow plate is planar as a whole.

Further, a lamination structure is known in which metal plates are bonded to the hollow plate described above to improve the strength and appearance. For example, Japanese Laid-Open Patent Publication No. 10-156985 describes a composite plastic structure of high strength and rigidity that is manufactured by bonding a metal plate, which may be made of steel, stainless, or aluminum, to one or both sides of a hollow plate, which is made of a thermoplastic resin. Such a lamination structure may be manufactured by placing a metal plate on the upper surface of the hollow plate and pressing the metal plate from above with a heated jig to thermally fuse the hollow plate to the metal plate.

In this method for thermally fusing the hollow plate to the metal plate, the heated jig heats the superficial layer of the hollow plate through the metal plate. This process requires time to heat the metal plate and the superficial layer to adequate temperatures. Thus, when the superficial layer melts, the core layer of the hollow plate is also heated and melted. This softens the core layer in the middle section in the thickness direction of the hollow plate, causing the cell structure of the hollow plate to be easily compressed by the pressing pressure during thermal fusion. The strength of the lamination structure is therefore reduced.

SUMMARY OF THE INVENTION

It is an objective of the present invention to provide a lamination structure that is less likely to form scratches or dents in an object when the lamination structure strikes the object and a method for manufacturing a lamination structure that limits softening of the middle section in the thickness direction of a hollow plate when a metal plate is bonded to the hollow plate by thermal fusion.

To achieve the foregoing objective and in accordance with a first aspect of the present invention, a method is provided for manufacturing a lamination structure in which a metal plate is bonded, by thermal fusion, to a hollow plate that is made of a thermoplastic resin and includes a plurality of cells formed inside the hollow plate. The method includes: heating the metal plate; and placing the heated metal plate on a surface of the hollow plate and bonding the metal plate to the hollow plate by thermal fusion caused by heat of the metal plate.

A hollow plate and a metal plate are laminated and trimmed to have a desired planar shape and used for various applications as a lamination structure. The hollow plate and the metal plate may be flush with each other in the edge of a trimmed lamination structure. When such an edge of the lamination structure strikes an object, the edge of the metal plate, which has a relatively high strength, tends to apply impact force to the object, forming scratches or dents in the object.

To achieve the foregoing objective and in accordance with a second aspect of the present invention, a lamination structure is provided in which a metal plate is bonded to a hollow plate that is made of a thermoplastic resin and includes a plurality of cells formed inside the hollow plate. The metal plate includes an edge located inward of an edge of the hollow plate in a plane direction of the lamination structure.

Lamination structures are light yet strong. As such, lamination structures have been used for vehicle parts, which need to be lighter to improve fuel efficiency. Examples of such vehicle parts include planar parts, such as luggage boards and cargo covers. However, the complex plastic structure described in Japanese Laid-Open Patent Publication No. 10-156985 is formed merely by bonding flat metal plates to a hollow plate made of a thermoplastic resin and thus not suitable for vehicle parts. This structure has limited usability.

To achieve the foregoing objective and in accordance with a third aspect of the present invention, a lamination structure is provided that includes a hollow plate that is made of a thermoplastic resin and includes a plurality of cells formed inside the hollow plate and a metal component that is bonded to the hollow plate. The hollow plate includes a plastic recess that is thermally deformed by the metal component. The metal component is bonded to the plastic recess.

To achieve the foregoing objective and in accordance with a fourth aspect of the present invention, a lamination structure is provide that includes a hollow plate that is made of a thermoplastic resin and includes a plurality of cells formed inside the hollow plate and metal plates that are bonded to opposite surfaces of the hollow plate. At least one of surfaces of the lamination structure to which the metal plates are bonded includes a recess formed by thermal deformation. In the recess, the cells of the hollow plate are thinned.

To achieve the foregoing objective and in accordance with a fifth aspect of the present invention, a method is provided for manufacturing a lamination structure in which a metal plate is bonded, by thermal fusion, to a hollow plate that is made of a thermoplastic resin and includes a plurality of cells formed inside the hollow plate. The method includes: stamping the metal plate to form a recess in the metal plate; heating the metal plate including the recess; and placing the heated metal plate on a surface of the hollow plate and bonding the metal plate to the hollow plate by thermal fusion caused by heat of the metal plate.

Other aspects and advantages of the present invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which:

FIGS. 3A to 3I are explanatory diagrams showing a method for bonding metal plates to a hollow plate;

FIGS. 12A to 12I are explanatory diagrams showing a method for bonding metal plates to a hollow plate;

DETAILED DESCRIPTION OF THE PREFERRED EMBODIMENTS

First Embodiment

Referring to FIGS. 1A to 3I, a first embodiment of a lamination structure according to the present invention and a method for manufacturing the same will now be described.

Figure 1A:
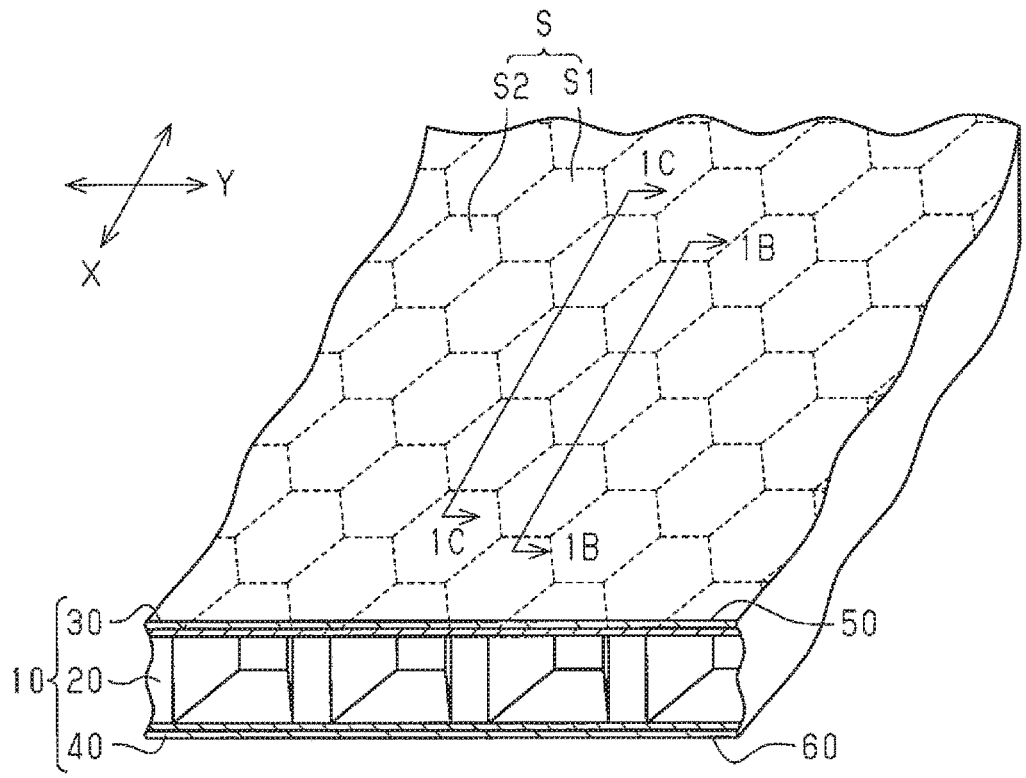
FIG. 1A is a perspective view showing a lamination structure according to a first embodiment of the present invention.

As shown in FIG. 1A, the lamination structure includes a hollow plate 10, which has the shape of a hollow plate as a whole, and metal plates 50 and 60, which are placed on the upper and lower sides of the hollow plate 10. As shown in FIG. 1A, the hollow plate 10 includes a core layer 20, in which cells S are arranged side by side, and sheet-shaped superficial layers 30 and 40, which are bonded to the upper and lower sides of the core layer 20.

Figure 1B:
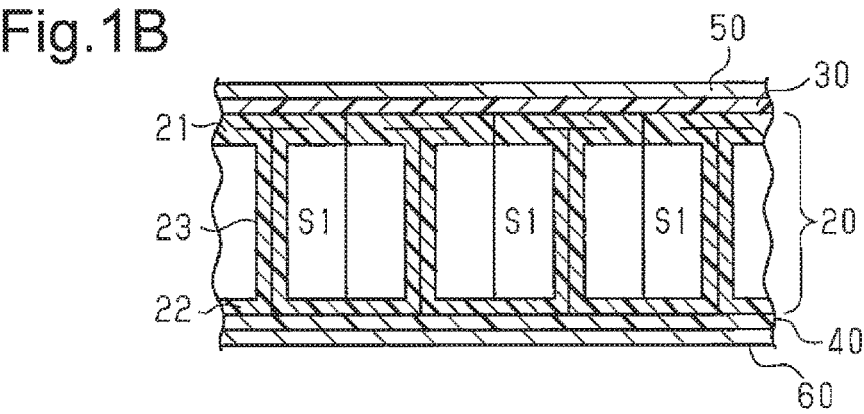
FIG. 1B is a cross-sectional view taken along line 1B-1B in FIG. 1A.
Figure 1C:
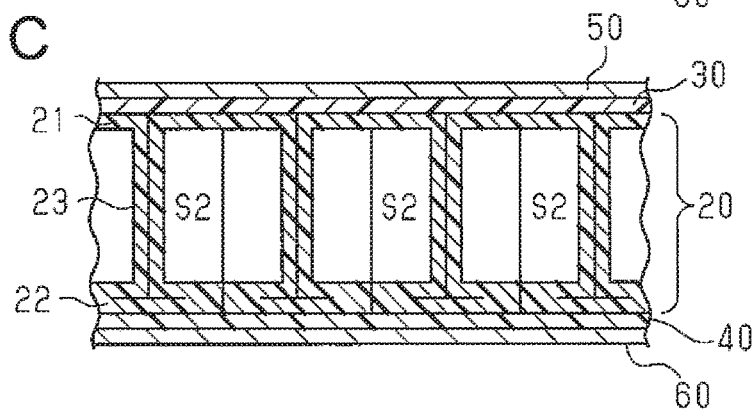
FIG. 1C is a cross-sectional view taken along line 1C-1C in FIG. 1A.

Referring to FIGS. 1B and 1C, the core layer 20 is formed by folding a single sheet member, which is made of a thermoplastic resin and has a predetermined shape. The core layer 20 includes upper walls 21, lower walls 22, and side walls 23. The side walls 23 extend between the upper walls 21 and the lower walls 22 and define cells S inside the core layer 20. Each cell S has the shape of a hexagonal column.

The cells S include first cells S1 and second cells S2, which differ in structure from the first cells S1. Each first cell S1 has a double-layer upper wall 21 above the side walls 23. The layers of the upper wall 21 are bonded to each other. In addition, the first cell S1 has a single-layer lower wall 22 under the side walls 23. In contrast, each second cell S2 has a single-layer upper wall 21 above the side walls 23. In addition, the second cell S2 has a double-layer lower wall 22 under the side walls 23. The layers of the lower wall 22 are bonded to each other. Adjacent first cells S1 are separated by double-layer side walls 23, and adjacent second cells S2 are separated by double-layer side walls 23. Each double-layer side wall 23 includes a middle section in the thickness direction of the core layer 20 where the layers are not thermally fused to each other. Accordingly, the internal cavity of each cell S communicates with the internal cavities of other cells S through the non-fused section in the side walls 23.

As shown in FIGS. 1A to 1C, the first cells S1 are arranged to form a line along the X-axis. Similarly, the second cells S2 are arranged to form a line along the X-axis. The lines of first cells S1 and second cells S2 are arranged alternately along the Y-axis. The Y-axis is perpendicular to the X-axis. The core layer 20 as a whole has a honeycomb structure of first and second cells S1 and S2.

A superficial layer 30, which is a sheet member made of a thermoplastic resin, is bonded to the upper surface of the core layer 20. In addition, a superficial layer 40, which is a sheet member made of a thermoplastic resin, is bonded to the lower surface of the core layer 20. The core layer 20 and the superficial layers 30 and 40 form the hollow plate 10, which has the shape of a hollow plate. In FIGS. 1B and 1C, reference numerals are given only to the leftmost cell S among the plurality of cells S shown, but the other cells S have the same configurations.

A metal plate 50 is bonded to the upper surface of the hollow plate 10, which is an outer surface of the superficial layer 30, by thermal fusion. The metal plate 50 may be made of a metal, such as aluminum alloy, ferrous alloy, or copper alloy, and have a thickness of about 0.05 to 4 mm, preferably of 2 mm or less, for example. A metal plate 60 is bonded to the lower surface of the hollow plate 10, which is an outer surface of the superficial layer 40, by thermal fusion. The metal plate 60 is identical to the metal plate 50 in structure.

Referring to FIGS. 2A to 3I, a method for manufacturing a lamination structure according to a first embodiment will now be described. First, a method for manufacturing the hollow plate 10 will be described.

Figure 2A:
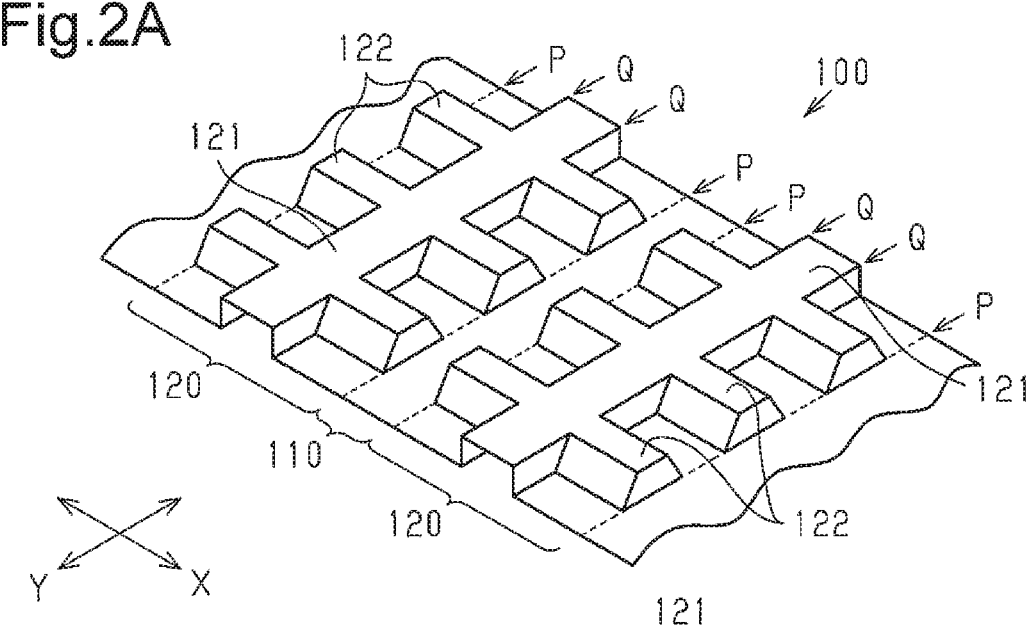
FIG. 2A is a perspective view showing a sheet member for forming a core layer of a hollow plate.

As shown in FIG. 2A, a first sheet member 100 is produced by forming a single sheet, which is made of a thermoplastic resin, into a predetermined shape. The first sheet member 100 includes flat regions 110 in a strip shape and protrusion regions 120, which alternate in the longitudinal direction of the first sheet member 100 (the X-axis). Each protrusion region 120 also includes a first protrusion section 121, which extends over the entire length of the protrusion region 120 in the direction in which the protrusion region 120 extends (the Y-axis). The first protrusion section 121 has the shape of an inverted groove formed by an upper surface and two side surfaces. The upper surface of the first protrusion section 121 preferably form an angle of 90° with the side surfaces, and thus the cross-section of the first protrusion section 121 has the shape of inverted letter U. The width of the first protrusion section 121, which is the transverse dimension of the upper surface of the first protrusion section 121, is equal to the width of the flat regions 110. The width of the first protrusion section 121 is double the protrusion height of the first protrusion section 121, which is the transverse dimension of the side surfaces of first protrusion section 121.

Each protrusion region 120 includes second protrusion sections 122, which are perpendicular to the first protrusion section 121. The cross-section of each second protrusion section 122 has the shape of a trapezoid that is obtained by dividing a regular hexagon into equal halves by the longest diagonal line. The protrusion height of the second protrusion sections 122 is equal to the protrusion height of the first protrusion section 121. The distance between adjacent second protrusion sections 122 is equal to the width of the upper surfaces of the second protrusion sections 122.

The first and second protrusion sections 121 and 122 are formed by partly deforming the sheet to protrude upward using the plasticity of the sheet. The first sheet member 100 is formed from a single sheet using a known method, such as vacuum forming or compression forming.

Figure 2B:
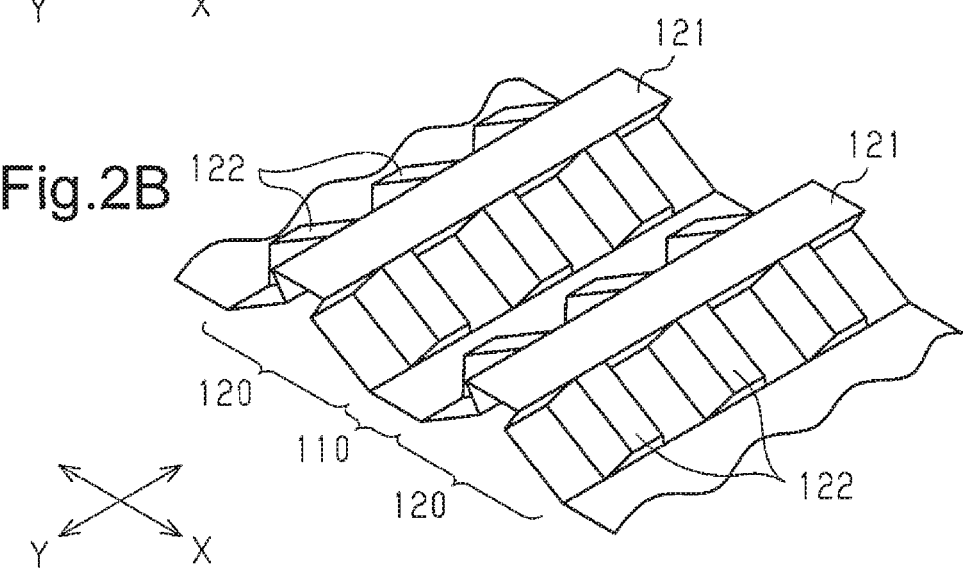
FIG. 2B is a perspective view showing a state where the sheet member is being fold.
Figure 2C:
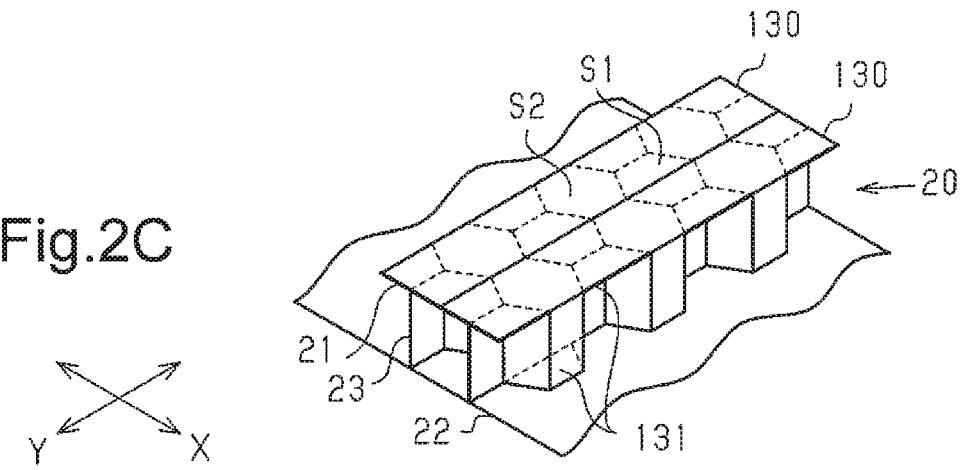
FIG. 2C is a perspective view showing the sheet member in the folded state.

As shown in FIGS. 2A and 2B, the core layer 20 is formed by folding the first sheet member 100 along borderlines P and Q. Specifically, the first sheet member 100 is first folded to form a valley along each of the borderlines P between flat regions 110 and protrusion regions 120, and then folded to form a ridge along each of the borderlines Q between the upper surfaces and the side surfaces of the first protrusion sections 121 so that the first sheet member 100 is compressed along the X axis. As shown in FIGS. 2B and 2C, the upper surface of each first protrusion section 121 is folded over the side surfaces, and the end surface of each second protrusion section 122 is folded over the flat region 110. Thus, in the first sheet member 100, one protrusion region 120 forms one partitioned element 130, which has the shape of a column extending along the Y-axis. The partitioned elements 130 are formed continually along the X-axis, thereby forming the core layer 20 having the shape of a hollow plate.

When the first sheet member 100 is compressed, the upper surfaces and the side surfaces of the first protrusion sections 121 form the upper walls 21 of the core layer 20, and the end surfaces of the second protrusion sections 122 and the flat regions 110 form the lower walls 22 of the core layer 20. The upper walls 21 where the upper surfaces of the first protrusion sections 121 are folded over the side surfaces to form double-layer structure and the lower walls 22 where the end surfaces of the second protrusion sections 122 are folded over the flat regions 110 to form double-layer structure serve as overlap sections 131.

The regions that are formed by the folded second protrusion sections 122 and each have the shape of a hexagonal column serve as second cells S2, and the regions formed between corresponding two adjacent partitioned elements 130 and each have the shape of a hexagonal column serve as first cells S1. The upper surfaces and side surfaces of the second protrusion sections 122 form the side walls 23 of the second cells S2, and the side surfaces of the second protrusion sections 122 and the flat sections of the protrusion regions 120 between the second protrusion sections 122 form the side walls 23 of the first cells S1. The sections where the upper surfaces of second protrusion sections 122 are in contact with each other and the sections where the flat sections of the protrusion region 120 are in contact with each other separately form double-layer side walls 23. The first sheet member 100 is preferably heated and softened before the folding process.

A second sheet member, which is made of a thermoplastic resin, is bonded to each of the upper and lower surfaces of the core layer 20 by thermal fusion. The second sheet member bonded to the upper surface of the core layer 20 serves as the superficial layer 30, and the second sheet member bonded to the lower surface of the core layer 20 serves as the superficial layer 40.

When thermally fusing the superficial layers 30 and 40 to the core layer 20, the double-layer upper walls 21 (overlap sections 131) of the first cells S1 are thermally fused, and similarly the double-layer lower walls 22 (overlap sections 131) of the second cells S2 are thermally fused. The double-layer side walls 23 of the first and second cells S1 and S2 receive less heat than the upper and lower walls 21 and 22. As a result, each double-layer side wall 23 includes a middle section in the thickness direction of the hollow plate 10 that is not bonded by thermal fusion. Accordingly, the internal cavities of cells S are not completely sealed and communicate with one another through gaps between the double-layer side walls 23 that are not bonded by thermal fusion.

Referring to FIGS. 3A to 3I, a method for manufacturing a lamination structure by bonding metal plates 50 and 60 to a hollow plate 10 will now be described.

As shown in FIG. 3A, first, a metal plate 50 is placed on one side in the thickness direction (first surface) of a flat support plate 210, and a metal plate 60 is placed on the other side in the thickness direction (second surface) of the support plate 210. The first and second surfaces of the support plate 210 each include air suction holes. The first and second surfaces of the support plate 210 attract and support the metal plates 50 and 60 when air is drawn through the air suction holes in the support plate 210.

Then, as shown in FIG. 3B, the support plate 210, on which the metal plates 50 and 60 are supported, is placed between two heating plates 220. The plane shape of the heating plates 220, which function as heating members, is larger than or equal to the plane shape of the metal plates 50 and 60. In FIGS. 3A to 3I, the heating plates 220 and the metal plates 50 and 60 are shown as the same size. The opposed surfaces of the heating plates 220 are heated to a temperature higher than or equal to the melting temperature of the thermoplastic resin forming the hollow plate 10, which may be several hundred degrees or higher, for example. The opposed surfaces of the heating plates 220 each include air suction holes. The opposed surfaces of the heating plates 220 attract and support the metal plates 50 and 60 when air is drawn through the air suction holes in the heating plates 220.

After placing the support plate 210, on which the metal plates 50 and 60 are supported, between the two heating plates 220, the two heating plates 220 are moved toward each other as shown in FIG. 3C. As indicated by the arrow in FIG. 3C, the two heating plates 220 sandwich the support plate 210, on which the metal plates 50 and 60 are supported. In this state, at least one of the air suction through the support plate 210 and the air suction through the heating plates 220 is performed. As such, the metal plates 50 and 60 are supported by the support plate 210 and/or the heating plates 220 and thus held between the support plate 210 and the heating plates 220. In this state, the entire surfaces of the metal plates 50 and 60 are in planar contact with the opposed surfaces of the heating plates 220 and therefore heated by the heat of the heating plates 220. The step in which the heating plates 220 support the metal plates 50 and 60 corresponds to the heating step of heating the metal plates 50 and 60.

Then, as shown in FIG. 3D, the heating plates 220, on which the metal plates 50 and 60 are supported, are moved away from each other. The support plate 210 is then moved in the direction of the arrow in FIG. 3D away from between the two heating plates 220. After moving the support plate 210, as shown in FIG. 3E, a hollow plate 10 is placed between the two heating plates 220. In this state, the metal plates 50 and 60, which are in planar contact with the opposed surfaces of the two heating plates 220, face the outer surfaces of the hollow plate 10.

After placing the hollow plate 10 between the two heating plates 220, as shown in FIG. 3F, the two heating plates 220 are moved toward each other. This moves the heating plates 220 toward the hollow plate 10 and brings the heated metal plates 50 and 60, which are supported by respective heating plates 220, into planar contact with the outer surfaces of the hollow plate 10. Here, the metal plates 50 and 60, which are heated to a high temperature, are bonded to the outer surfaces of the hollow plate 10 by thermal fusion caused by their own heat. After the metal plates 50 and 60 are brought into planar contact with the outer surfaces of the hollow plate 10, the air suction through the heating plates 220 is stopped, and the heating plates 220 are moved away from each other. In this process, the heating plates 220 sandwich the hollow plate 10 through the metal plates 50 and 60 only for a very short time. Thus, the heat of the heating plates 220 is not transferred excessively to the hollow plate 10. The step described above, in which the hollow plate 10 is placed between the two heating plates 220 on which the metal plates 50 and 60 are supported, the metal plates 50 and 60 are bonded to the outer surfaces of the hollow plate 10 by thermal fusion, and the heating plates 220 are moved away from each other, corresponds to the thermal fusion step.

After bonding the metal plates 50 and 60 to the outer surfaces of the hollow plate 10 by thermal fusion, as shown in FIG. 3G, the hollow plate 10, which is placed between the two heating plates 220 is moved to be placed between two press plates 230. The plane shape of the press plates 230 is larger than or equal to the plane shape of the metal plates 50 and 60. In FIGS. 3A to 3I, the press plates 230 and the metal plates 50 and 60 are shown as the same size. Unlike the heating plates 220, the press plates 230 are not heated and have ordinary temperature. After placing the hollow plate 10 between the two press plates 230, the press plates 230 are moved toward each other. The two press plates 230 sandwich and press the hollow plate 10 in the thickness direction with a predetermined pressure. The press plates 230 thus press the entire areas of the metal plates 50 and 60 against the hollow plate 10. As such, the metal plates 50 and 60 are pressed against and bonded to the hollow plate 10 under uniform pressure. This adjusts the thickness of the lamination structure and forms a flat planar lamination structure that is free from warpage. Then, the two press plates 230 are moved away from each other. As shown in FIG. 3I, the hollow plate 10 to which the metal plates 50 and 60 are bonded by thermal fusion, or a lamination structure, is then moved away from between the two press plates 230.

As described above, the heated metal plates 50 and 60 are bonded to the hollow plate 10 by thermal fusion caused by their own heat. Accordingly, the hollow plate 10 receives only a very small amount of heat from the heating plates 220. Further, the press plates 230 are not heated for thermal fusion. Thus, even if the metal plates 50 and 60 still maintain a high temperature when the press plates 230 press the hollow plate 10, the press plates 230 absorb heat from the metal plates 50 and 60 while in contact with the metal plates 50 and 60. This rapidly cools the metal plates 50 and 60. As a result, heat is not transferred excessively to the middle of the hollow plate 10 in the thickness direction, and the middle section of the hollow plate 10 in the thickness direction is less likely to soften. Therefore, the structure of the cells S in the hollow plate 10 resists collapsing when the two press plates 230 press the hollow plate 10.

The first embodiment achieves the following advantages.

(1) The preheated metal plates 50 and 60 are brought into planar contact with the outer surfaces of the hollow plate 10 and soften the outer surfaces of the hollow plate 10 with their own heat to achieve thermal fusion. With this method, the amount of heat that the hollow plate 10 receives generally does not exceed the amount of heat retained in the heated metal plates 50 and 60. As a result, the hollow plate 10 does not receive excessive heat from the metal plates 50 and 60, limiting softening of the middle section of the hollow plate 10 in the thickness direction.

(2) The heating plates 220 are moved away from each other immediately after the metal plates 50 and 60 are brought into planar contact with the outer surfaces of the hollow plate 10. Thus, the heating plates 220 sandwich the hollow plate 10 through the metal plates 50 and 60 only for a very short time. This limits excessive transfer of heat from the heating plates 220 to the hollow plate 10.

(3) After the metal plates 50 and 60 are bonded to the outer surfaces of the hollow plate 10 by thermal fusion, the press plates 230 press the hollow plate 10. The metal plates 50 and 60 are thus pressed against and bonded to the hollow plate 10 under uniform pressure. This adjusts the thickness of the lamination structure and forms a flat planar lamination structure that is free from warpage.

(4) The two press plates 230 are not heated for thermal fusion. Thus, even if the metal plates 50 and 60 maintain a high temperature after bonded to the outer surfaces of the hollow plate 10 by thermal fusion, the two press plates 230 cool the metal plates 50 and 60. This limits excessive transfer of heat from the metal plates 50 and 60 to the hollow plate 10.

(5) The plane shape of the two heating plates 220 is larger than the plane shape of the metal plates 50 and 60, and the metal plates 50 and 60 are brought into planar contact with the opposed surfaces of the heating plates 220 and heated. This achieves uniform heating of the metal plates 50 and 60. In addition, the planar contact between the metal plates 50 and 60, which are supported on the heating plates 220, and the outer surfaces of the hollow plate 10 allows the metal plates 50 and 60 to be uniformly bonded to the outer surfaces of the hollow plate 10 by thermal fusion.

(6) The internal cavities of the cells S in the core layer 20 are not completely closed and communicate with one another. Thus, when bonding the metal plates 50 and 60 to the outer surfaces of the hollow plate 10, the expanded air resulting from heated internal cavities of cells S may be discharged out of the hollow plate 10 through the internal cavities of other cells S. Thus, the structure of the cells S of the hollow plate 10 is less likely to be deformed, for example, by air expansion pressure.

The first embodiment may be modified as follows.

The first embodiment forms the core layer 20, which is of a honeycomb structure, by folding and shaping a single first sheet member 100 such that hexagonal cells S are formed in the core layer 20. However, the present invention is not limited to this method. For example, sheet strips may be bent separately and arranged at predetermined intervals to form side walls of cells. Superficial layers may then be placed on the upper and lower sides of the sheet strips to form the upper and lower walls of cells. Alternatively, a known forming method, such as vacuum forming or compression forming, may be used to form protrusions and depressions in sheet strips to form a core layer 20, and superficial layers may be placed on the upper and lower sides of the core layer 20. Further, as described in Japanese Patent No. 4368399, a three-dimensional structure including protrusions of trapezoidal cross-section may be folded successively to form a honeycomb structure as a core layer 20.

The first embodiment forms cells S, each having the shape of a hexagonal column, inside the core layer 20. However, there is no limitation to the shape of the cells S, and the cells S may have the shape of a polygon, such as quadrangular column or octagonal column, or a cylinder, for example. The cells S may be shaped as a truncated cone. The cells S may have different shapes. Further, cells do not have to be adjacent to one another, and there may be a gap between adjacent cells S.

The hollow plate 10 does not have to include columnar cells S. For example, the hollow plate 10 may be formed by bonding superficial layers to the upper and lower sides of a core layer having a predetermined uneven shape. Such a hollow plate is described in Japanese Laid-Open Patent Publication No. 2014-205341, for example. Alternatively, the hollow plate 10 may be a corrugated plastic board that has a harmonica-shaped cross-section.

The superficial layers 30 and 40 may be bonded to the core layer 20 in any method and may be bonded by adhesion or ultrasonic welding.

The superficial layers 30 and 40 may be multilayered. For example, the superficial layer 30 or 40 may include an adhesion layer, which melts at a relatively low temperature, and a functional layer, which has additional characteristics such as flame retardancy. In this case, adhesion layers are preferably placed on the surfaces of the superficial layers that are to be bonded to the core layer 20 and the metal plates 50 and 60.

Additional layers may be placed between the metal plates 50 and 60 and the hollow plate 10 or the superficial layers 30 and 40. For example, a nonwoven fabric may be bonded to the upper surface of the hollow plate 10 or the superficial layer 30, and the metal plate 50 may be bonded to the upper surface of the nonwoven fabric. In this case, the nonwoven fabric serves as a layer forming the hollow plate 10. Further, an additional layer (e.g., nonwoven fabric) may be bonded to the upper surface of the metal plate 50 or 60.

One or both of the superficial layers 30 and 40 may be omitted. In the core layer 20 of the first embodiment, the layers of the double-layer upper wall 21 of each first cell S1 are bonded to each other by thermal fusion, and the layers of the double-layer lower wall 22 of each second cell S2 are bonded to each other by thermal fusion. This allows the core layer 20 by itself to maintain its planar shape and thus serve as the hollow plate 10. When the superficial layers 30 and 40 are not bonded to the upper and lower sides of the core layer 20, the upper section of each first cell S1 and the lower section of each second cell S2 in the core layer 20 are not completely closed. Thus, when bonding the metal plates 50 and 60 to the core layer 20 (hollow plate) by thermal fusion, the air introduced between the core layer 20 and the metal plates 50 and 60 flows into the internal cavities of the first and second cells S1 and S2. In the first embodiment, the layers of each double-layer side wall 23 of the cells S are not bonded to each other, allowing communication between internal cavities of the cells S. Thus, the air introduced into the internal cavity of a cell S is discharged out of the core layer 20 through the internal cavities of other cells S. As such, when one or both of the superficial layers 30 and 40 are omitted or the core layer 20 is used as the hollow plate by itself, deairing process is not required to remove the air introduced when bonding the metal plates 50 and 60 to the core layer 20 by thermal fusion. This limits bulging or sinking of the bonded metal plates 50 and 60 that may otherwise be caused by the air in the hollow plate 10.

One of the metal plates 50 and 60 may be omitted. That is, the metal plate 50 or 60 may be bonded to only one side of the hollow plate 10 by thermal fusion. This still limits warpage of the hollow plate 10.

The plane shape of the metal plates 50 and 60 may be in any relationship with the plane shape of the hollow plate 10. For example, the bonded metal plate 50 or 60 may be smaller than the plane shape of the hollow plate 10. When the metal plate 50 or 60 is bonded to a part of the outer surface of the hollow plate 10, the hollow plate 10 is heated only in the part to which the metal plate 50 or 60 is bonded. This limits change in the plate thickness and reduction in surface smoothness of the hollow plate 10 that may be caused by bonding of the metal plate 50 or 60. In particular, when the metal plate 50 or 60 is bonded to an area that is smaller than or equal to one-half or one-third of the entire outer surface of the hollow plate 10, the part of the core layer 20 to which the metal plate 50 or 60 is not bonded remains unheated, reducing the possibility of the structure of cells S collapsing. This limits strength reduction of the hollow plate 10.

The metal plates 50 and 60 may include holes, for example. Further, as long as the hollow plate 10 is planar, the hollow plate 10 may be curved or bent. In this case, the metal plates 50 and 60 are curved or bent to conform to the shape of the hollow plate 10.

A single metal plate may be extended over and bonded to a plurality of hollow plates. In this case, bonding of the metal plate integrates the hollow plates into one plate member.

Each of the metal plates 50 and 60 may include a metal layer, which is made of a metal, and a plastic layer, which is made of a thermoplastic resin and placed on at least one side of the metal layer. In this case, the heating plates 220 may be in planar contact with the metal layers of the metal plates 50 and 60 when supporting the metal plates 50 and 60. In addition, the heating temperature of the opposed surfaces of the heating plates 220 may be set to soften the plastic layers of the metal plates 50 and 60. The plastic layers in the metal plates 50 and 60 increase the bonding strength between the hollow plate 10 and the metal plates 50 and 60. Further, the plastic layers in the metal plates 50 and 60 may be made of a resin material that melts at a lower temperature than the resin material forming the hollow plate 10. Adhesion layers may be added to the metal plates 50 and 60 by bonding adhesive film to the metal layers, or plastic layers may be formed on the metal layers through surface treatment, such as primer treatment or anchoring treatment. Alternatively, an adhesive may be applied to the hollow plate 10 or the metal plates 50 and 60. Hot melt adhesives may be used for this purpose.

The metal plates 50 and 60 may be supported and moved by a structure other than the support plate 210. For example, a clamp for holding the upper sections of the metal plates 50 and 60 or a magnet for supporting the metal plates 50 and 60 by magnetic force may be used. Alternatively, the metal plates 50 and 60 may include depressions or holes into which pins are fitted to support the metal plates 50 and 60. Further, the heating plates 220 and the hollow plate 10 may be moved instead of the metal plates 50 and 60.

When the two heating plates 220 sandwich the support plate 210 on which the metal plates 50 and 60 are supported, air suction through the support plate 210 may be stopped, and air suction through the heating plates 220 may be started. In this case, as soon as the two heating plates 220 sandwich the support plate 210, the metal plates 50 and 60 are moved from the support plate 210 to the heating plates 220.

The support plate 210 and the two heating plates 220 may have air suction holes of any structure as long as the holes allow supporting of the metal plates 50 and 60. The air suction holes may have a smaller diameter to reduce the possibility that the holes leave marks on the metal plates 50 and 60.

The means to heat the metal plates 50 and 60 may be a burner, oven, or IH heater, for example. In this case, the heated metal plates 50 and 60 may be supported by the support plate 210 and moved into planar contact with the outer surfaces of the hollow plate 10.

The heating of the heating plates 220 may be stopped when the metal plates 50 and 60 are heated to a predetermined temperature or higher. This further limits transfer of excessive heat from the two heating plates 220 to the hollow plate 10 through the metal plates 50 and 60.

The two press plates 230 may be cooled so as not to exceed a predetermined temperature. Cooling of the press plates 230 prevents the press plates 230 from being heated to a high temperature even when repeatedly heated by the metal plates 50 and 60 during continuous manufacturing of lamination structures.

As long as sufficient bonding strength and the flatness of the surfaces of the metal plates 50 and 60 are maintained, the step of sandwiching and pressing with the two press plates 230 may be omitted. Depending on the bonding strength and appearance required for the lamination structure, the pressing step may be performed or omitted.

FIGS. 3A to 3I show the components including the support plate 210 and the heating plates 220 extending in the vertical direction. However, these components may be in any arrangement. For example, the components may extend in the horizontal direction.

Second Embodiment

Referring to FIGS. 4A to 6C, a second embodiment of a lamination structure and a method for manufacturing the same according to the present invention will now be described. The components of the second embodiment that are the same as the corresponding components of the first embodiment will not be described in detail.

Figure 4A:
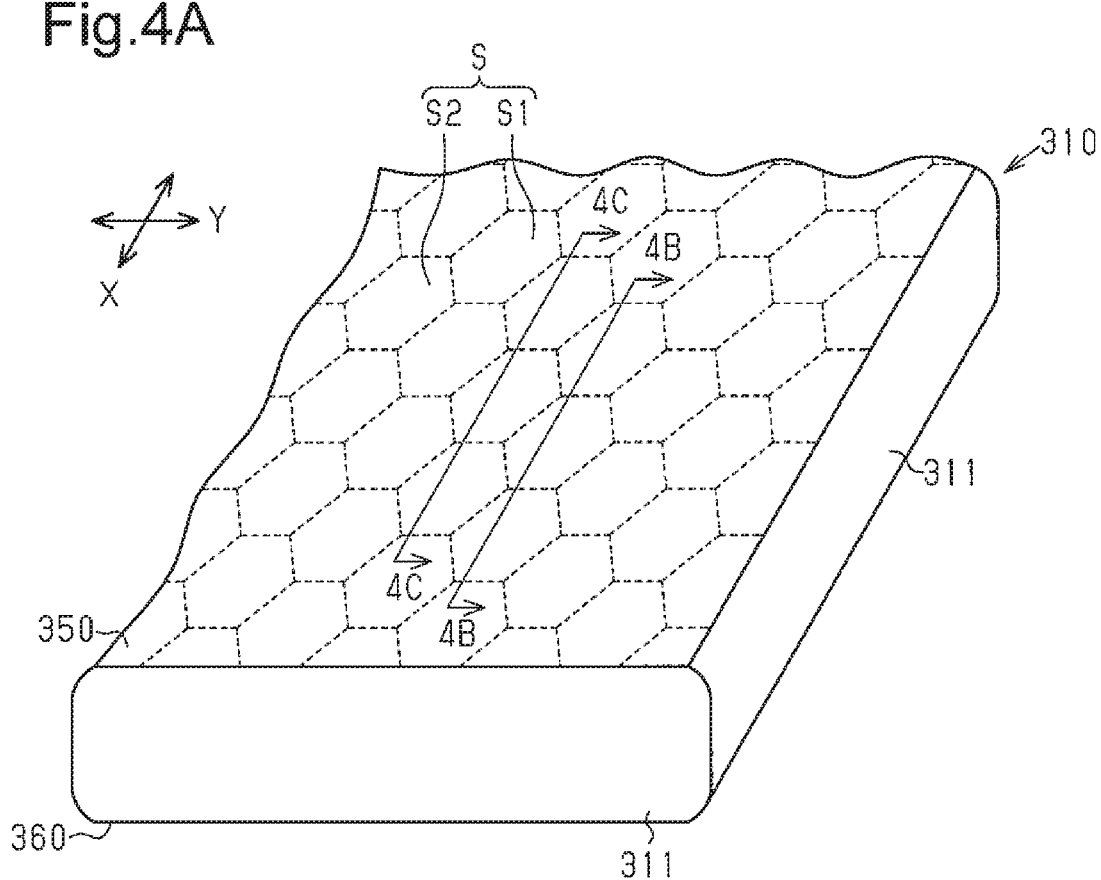
FIG. 4A is a perspective view showing a lamination structure according to a second embodiment of the present invention.
Figure 4B:
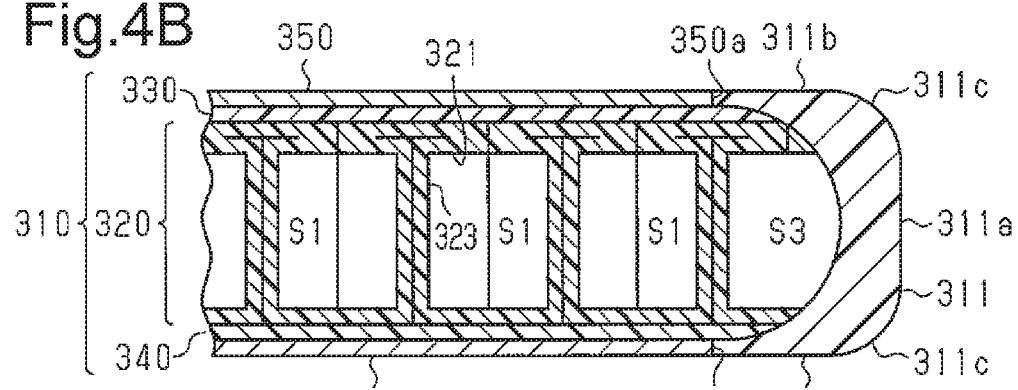
FIG. 4B is a cross-sectional view taken along line 4B-4B in FIG. 4A.
Figure 4C:
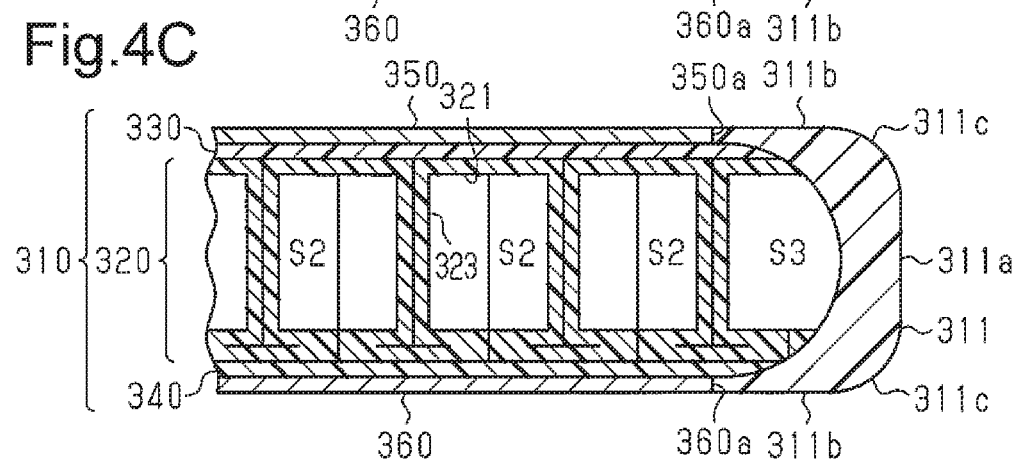
FIG. 4C is a cross-sectional view taken along line 4C-4C in FIG. 4A.

As shown in FIGS. 4A to 4C, the periphery of a hollow plate 310 includes a sealing section 311 that seals the hollow plate 310 so that the internal cavities of the cells S are not exposed to the outside. The sealing section 311 is formed by heating and compressing the periphery of the hollow plate 310 inward. As such, the sealing section 311 is formed integrally with the hollow plate 310 from the thermoplastic resin forming the core layer 320 and the superficial layers 330 and 340 of the hollow plate 310. The sealing section 311 is formed over the entire circumference of the hollow plate 310.

The sealing section 311 has a tetragonal cross-section as a whole. More specifically, the sealing section 311 includes upper and lower flat surfaces 311b, which extend in the plane direction of the lamination structure (the lateral direction as viewed in FIGS. 4B and 4C), and upper and lower inclined surfaces 311c, which obliquely extend in an arc shape from the respective flat surfaces 311b toward the middle in the thickness direction. The sealing section 311 also includes an end surface 311a, which extends between the inclined surfaces 311c in the thickness direction of the lamination structure. The end surface 311a of the sealing section 311 forms the edge of the hollow plate 310. Cavities S3, which are formed from internal cavities of cells S when the hollow plate 310 is compressed, are defined in the sealing section 311. FIGS. 4B and 4C show a cavity S3 in the sealing section 311 as having a semi-circular cross-section. However, the shape and size of each cavity S3 may vary depending on the temperature or compression degree in the formation of the sealing section 311. Further, FIGS. 4B and 4C show the sealing section 311 as a member separate from the core layer 320 and the superficial layers 330 and 340. However, the sealing section 311 is formed integrally with the core layer 320 and the superficial layers 330 and 340.

The edge 350a of the metal plate 350 is located inward of the edge of the hollow plate 310, which is the end surface 311a of the sealing section 311, in the plane direction of the lamination structure (located on the left side as viewed in FIGS. 4B and 4C). In other words, the sealing section 311 is located outward of the edge 350a of the metal plate 350 in the hollow plate 310. The edge 360a of the metal plate 360 is located inward of the end surface 311a of the sealing section 311 in the plane direction of the lamination structure.

Referring to FIGS. 5A to 6C, a method for forming a sealing section 311 in the periphery of a hollow plate 310, which is rectangular as viewed from above, will now be described.

Figure 5A:
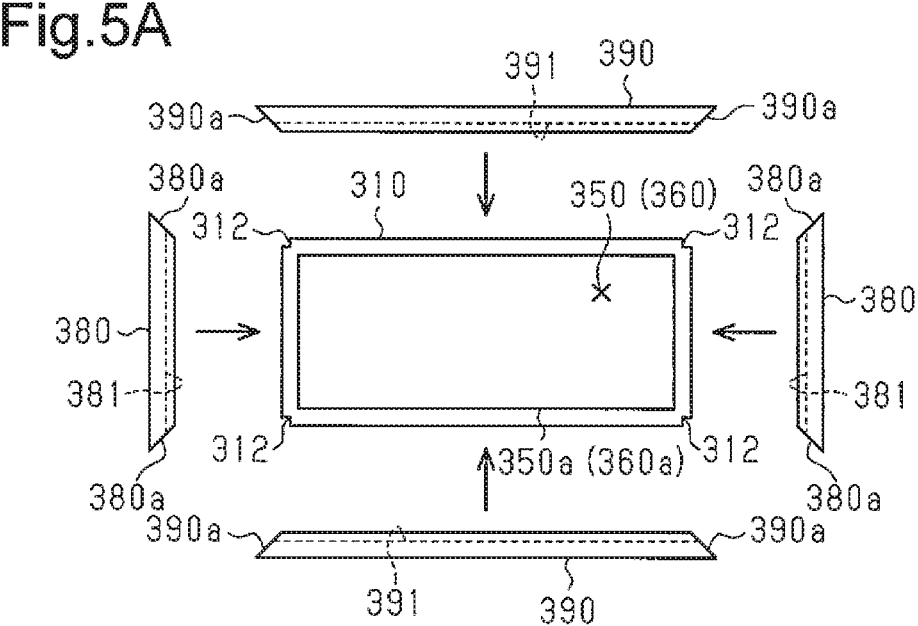
FIG. 5A is an explanatory diagram showing a periphery sealing process.

First, in preparation for forming a sealing section 311 in the periphery of a hollow plate 310, a metal plate 350 is bonded to the upper surface of the hollow plate 310 by thermal fusion. As shown in FIG. 5A, the metal plate 350 is bonded to the upper surface of the hollow plate 310 such that the edge 350a of the metal plate 350 is located inward of the edge of the hollow plate 310 in the plane direction of the hollow plate 310. At this point, the periphery of the hollow plate 310 is not formed as a sealing section 311, and the hollow plate 310 does not include a sealing section 311. As such, the edge of the hollow plate 310 is the edges of the core layer 320 and the superficial layers 330 and 340. The distance between the edge 350a of the metal plate 350 and the edge of the hollow plate 310 is long enough to form the sealing section 311 and may be 1 mm to 5 cm, preferably 3 to 10 mm. In addition, a metal plate 360 is bonded to the lower surface of the hollow plate 310.

Figure 5B:
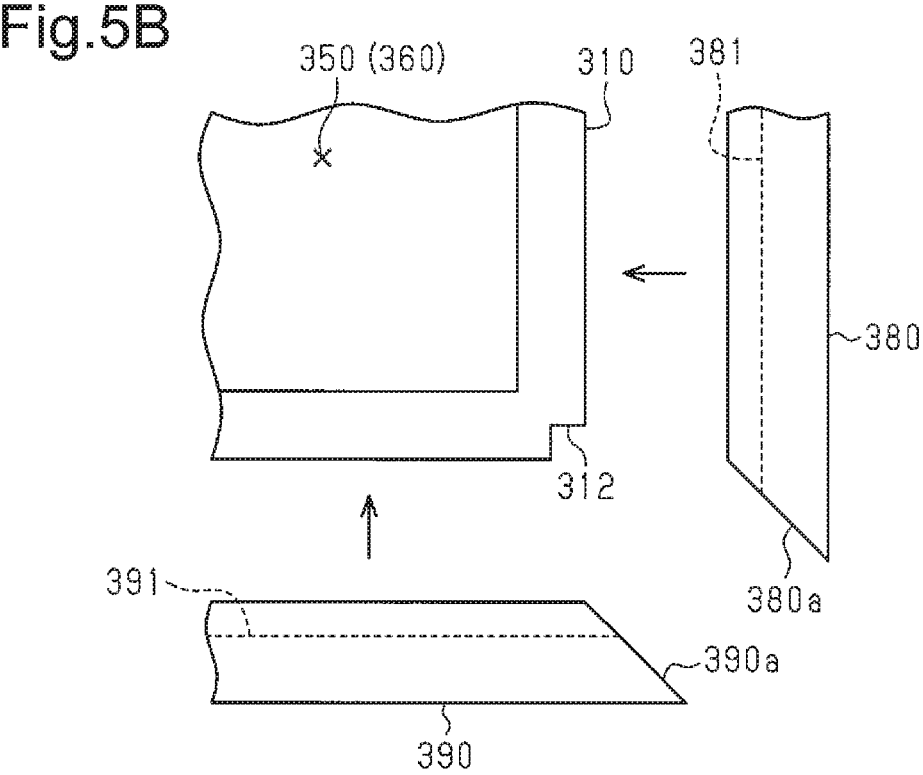
FIG. 5B is a partially enlarged view of FIG. 5A.

After bonding the metal plates 350 and 360 to the hollow plate 310, a notch 312 is formed in each of the four corners of the hollow plate 310. As shown in FIG. 5B, each notch 312 is square as viewed from above. The vertical and lateral dimensions of the notch 312 are set such that the notch 312 does not reach the metal plates 350 and 360 as viewed from above.

As shown in FIG. 5A, after the preparation process, the hollow plate 310 is subjected to a periphery sealing process, which uses a pair of short-side sealing jigs 380 and a pair of long-side sealing jigs 390. The pair of short-side sealing jigs 380 and the pair of long-side sealing jigs 390 are configured to be heated by an electromagnetic heater, for example, to a temperature that is higher than the melting temperature of the thermoplastic resin forming the hollow plate 310.

Each short-side sealing jig 380 is an elongated member as a whole. The longitudinal dimension of the inner side of the short-side sealing jig 380 is shorter than the longitudinal dimension of the outer side of the short-side sealing jig 380. Accordingly, each end of the short-side sealing jig 380 includes an inclined section 380a. The inclined section 380a is at an angle of 45° to the longitudinal axis of the short-side sealing jig 380. The longitudinal dimension of the inner side of the short-side sealing jig 380 is slightly shorter than the length of the short sides of the hollow plate 310, and the longitudinal dimension of the outer side of the short-side sealing jig 380 is slightly longer than the length of the short sides of the hollow plate 310.

Figure 6A:
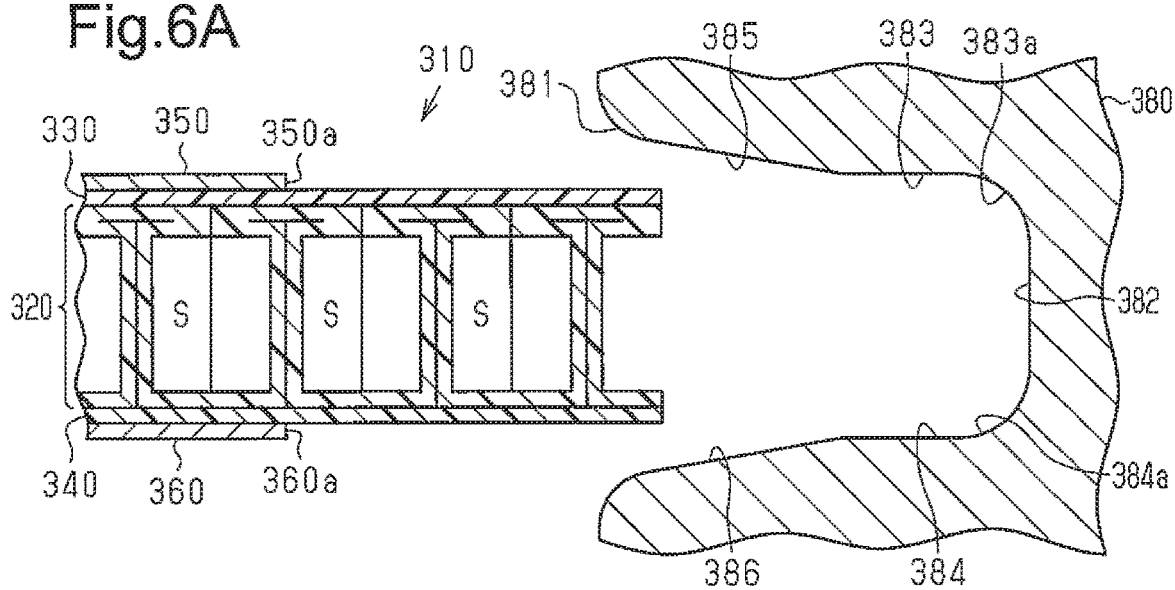
FIGS. 6A to 6C are cross-sectional views showing a lamination structure in a periphery sealing process.
Figure 6B:
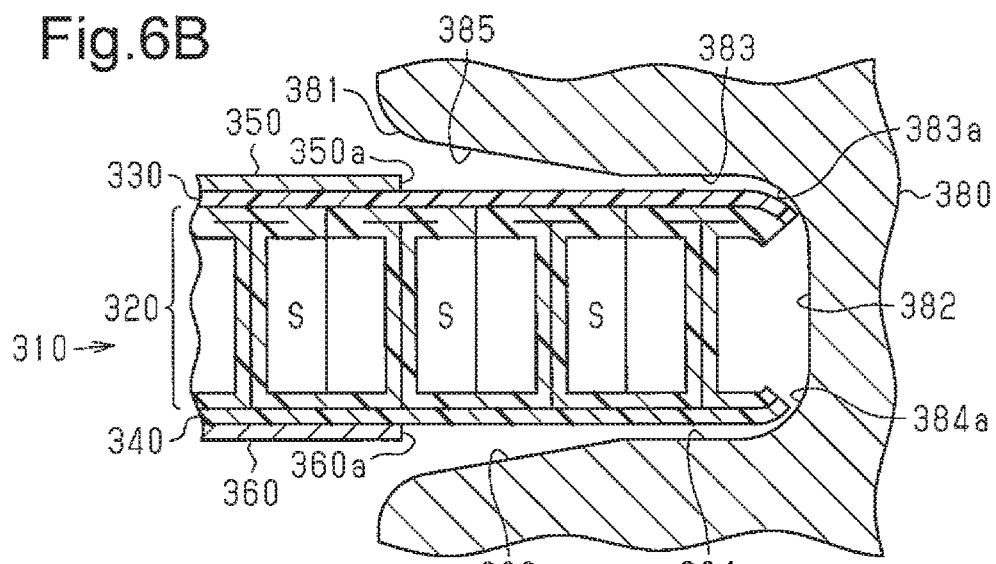
Figure 6C:
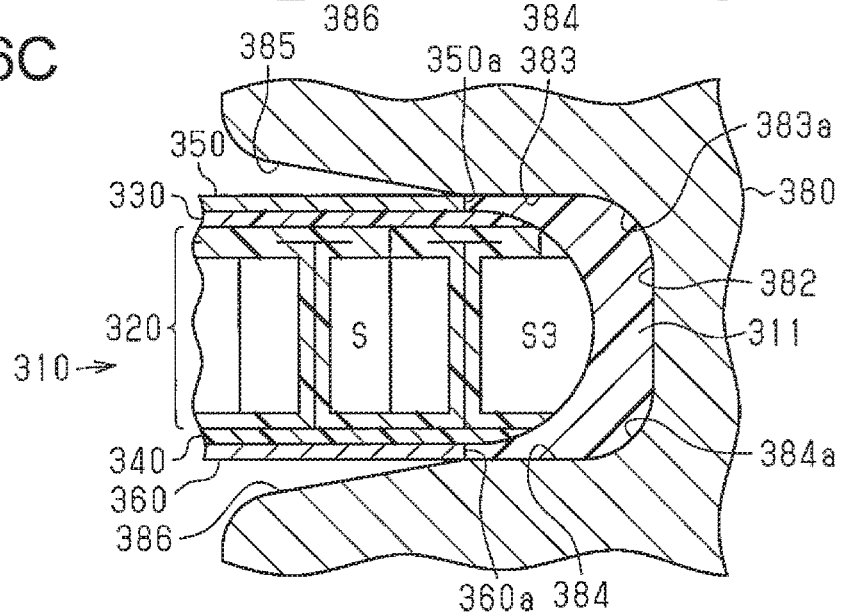

As shown in FIGS. 6A to 6C, the inner side of the short-side sealing jig 380 (the left side as viewed in FIGS. 6A to 6C) includes a groove 381, which extends outward (rightward as viewed in FIGS. 6A to 6C) and in the longitudinal direction of the short-side sealing jig 380. The groove 381 includes a base surface 382 and upper and lower inner surfaces 383 and 384 extending perpendicular to the base surface 382. In addition, the groove 381 includes an upper curved surface 383a, which is arched and connects the base surface 382 to the upper inner surface 383, and a lower curved surface 384a, which is arched and connects the base surface 382 to the lower inner surface 384. The distance between the upper inner surface 383 and the lower inner surface 384 is slightly greater than the thickness of the lamination structure, in which the metal plates 350 and 360 are bonded to the hollow plate 310 (the thickness between the upper surface of the metal plate 350 and the lower surface of the metal plate 360). The groove 381 also includes an upper tapered surface 385, which is continuous with the upper inner surface 383, and a lower tapered surface 386, which is continuous with the lower inner surface 384. The distance between the upper tapered surface 385 and the lower tapered surface 386 increases toward the opening of the groove 381. That is, the distance between the upper tapered surface 385 and the lower tapered surface 386 is greater than the thickness of the lamination structure, in which the metal plates 350 and 360 are bonded to the hollow plate 310.

As shown in FIG. 5A, each long-side sealing jig 390 is an elongated member as a whole. The longitudinal dimension of the inner side of the long-side sealing jig 390 is shorter than the longitudinal dimension of the outer side of the long-side sealing jig 390. Accordingly, each end of the long-side sealing jig 390 includes an inclined section 390a. The inclined section 390a is at an angle of 45° to the longitudinal axis of the long-side sealing jig 390. The longitudinal dimension of the inner side of the long-side sealing jig 390 is slightly shorter than the length of the long sides of the hollow plate 310, and the longitudinal dimension of the outer side of the long-side sealing jig 390 is slightly longer than the length of the long sides of the hollow plate 310. The inner side of the long-side sealing jig 390 includes a groove 391, which extends outward and in the longitudinal direction of the long-side sealing jig 390. The groove 391 of the long-side sealing jig 390 is identical in shape to the groove 381 of the short-side sealing jig 380.

As shown in FIG. 6A, when forming a sealing section 311 in the periphery of a short side of the hollow plate 310, a heated short-side sealing jig 380 is placed beside the periphery of the short side of the hollow plate 310. Then, as shown in FIG. 6B, the base surface 382 of the groove 381 in the short-side sealing jig 380 is pressed against the peripheral edge of the short side of the hollow plate 310. Then, the edges of the superficial layers 330 and 340 of the hollow plate 310 are guided by the upper curved surface 383a and the lower curved surface 384a of the groove 381 and bent toward the middle in the thickness direction of the hollow plate 310. As shown in FIG. 6C, when the base surface 382 of the groove 381 in the short-side sealing jig 380 is further pressed against the hollow plate 310, the periphery of the short side of the hollow plate 310 is compressed toward the middle in the plane direction of the hollow plate 310. This forms a sealing section 311 in the periphery of the hollow plate 310.

As described above, the short-side sealing jig 380 is heated. Thus, the section of the hollow plate 310 that is brought into contact with the short-side sealing jig 380 melts and gains fluidity. Part of the melted hollow plate 310 moves along the base surface 382, the upper curved surface 383a, the lower curved surface 384a, the upper inner surface 383, and the lower inner surface 384 of the groove 381 and then hardens. As such, the outer shape of the sealing section 311 in the periphery of the short side of the hollow plate 310 is substantially identical to the inner shape of the groove 381 of the short-side sealing jig 380. As shown in FIG. 4C, the sealing section 311 therefore includes a pair of upper and lower flat surfaces 311b and a pair of upper and lower inclined surfaces 311c.

The process of forming the sealing section 311 in the periphery of the hollow plate 310 as described above breaks the structure of some cells S in the hollow plate 310. However, the internal cavities of the cells S are unlikely to be completely filled with the molten resin. The cavities S3 are thus formed in the sealing section 311. FIG. 6C shows a cavity S3 having a semi-circular cross-section. However, the shape and size of each cavity S3 may vary depending on various conditions in the periphery sealing process.

As shown in FIG. 5A, the sealing section 311 is formed on the four sides of the periphery of the hollow plate 310 simultaneously using the pair of short-side sealing jigs 380 and the pair of long-side sealing jigs 390. Each short-side sealing jig 380 has an inclined section 380a in each end, and each long-side sealing jig 390 includes an inclined section 390a in each end. Thus, when the short-side sealing jigs 380 and the long-side sealing jigs 390 press the periphery of the hollow plate 310 simultaneously, the ends of the sealing jigs do not interfere with each other. In addition, the planar contact between the inclined sections 380a of the short-side sealing jigs 380 and the inclined sections 390a of the long-side sealing jigs 390 limits further inward movements of the short-side sealing jigs 380 and the long-side sealing jigs 390 in the plane direction of the hollow plate 310.

When the short-side sealing jigs 380 and the long-side sealing jigs 390 press the periphery of the hollow plate 310, part of the melted hollow plate 310 is pressed toward the longitudinal ends of the jigs 380 and 390 along the grooves 381 and 391 of the jigs 380 and 390. As such, the molten resin tends to flow to the border sections between the short-side sealing jigs 380 and the long-side sealing jigs 390, which are the four corners of the hollow plate 310. If an excessive amount of resin flows into these sections, the resin tends to be squeezed out through the gaps between the inclined sections 380a of the short-side sealing jigs 380 and the inclined sections 390a of the long-side sealing jigs 390 and harden, resulting in formation of fins. In this respect, as shown in FIG. 5B, the hollow plate 310 includes a notch 312 in each of the four corners. These notches 312 reduce the amount of plastic in the four corners of the hollow plate 310. Accordingly, the resin that flows into the four corners of the hollow plate 310 is less likely to be squeezed out of the short-side sealing jigs 380 and the long-side sealing jigs 390, reducing the possibility of fin formation.

The second embodiment achieves the following advantages.

(7) The edges 350a and 360a of the metal plates 350 and 360 are located inward of the end surface 311a of the sealing section 311, which forms the edge of the hollow plate 310. Thus, when the end surface 311a of the sealing section 311 strikes an object, the edges 350a and 360a of the metal plates 350 and 360, which are of relatively high strength, are less likely to apply striking force to the object. This reduces the possibility of scratches or dents formed in the object that is struck by the hollow plate 310.

(8) The sealing section 311 of the hollow plate 310 includes the inclined surfaces 311c, which are inclined toward the middle in the thickness direction of the hollow plate 310, such that the end surface 311a is free from sharp corners. Thus, when the edge of the hollow plate 310 strikes an object, scratches or dents are less likely to be formed in the object. Absence of sharp corners in the end surface 311a of the sealing section 311 of the hollow plate 310 limits ripping of a covering material covering the lamination structure that may otherwise occur from the section of contact between the covering material and a corner of the hollow plate 310. The covering material may be a fabric, nonwoven fabric, or vinyl-chloride sheet, for example.

(9) The periphery of the hollow plate 310 includes the sealing section 311. The sealing section 311, which is formed by compressing the periphery of the hollow plate 310, has a higher rigidity than the section in which the sealing section 311 is not formed. Accordingly, the overall rigidity of the lamination structure is improved compared to a structure that does not include the sealing section 311.

(10) The sealing section 311 is formed by heating and compressing the periphery of the hollow plate 310. Thus, the sealing section 311 is formed integrally with the core layer 320 and the superficial layers 330 and 340 of the hollow plate 310. Accordingly, the sealing section 311 resists peeling and dropping from the hollow plate 310 compared to a structure in which the hollow plate 310 is sealed by bonding a separate member to the peripheral edge of the hollow plate 310.

(11) The sealing section 311 is formed simultaneously on the four sides of the hollow plate 310, which is rectangular as viewed from above. This reduces the time required to form the sealing section 311 compared to a structure in which the sealing section 311 is formed separately on the different sides.

(12) A notch 312 is formed in each of the four corners of the hollow plate 310, which is rectangular as viewed from above, before forming the sealing section 311. Thus, even if an excessive amount of molten resin flows into the four corners of the hollow plate 310 when forming the sealing section 311 simultaneously on the four sides of the hollow plate 310, the molten resin is less likely to be squeezed out of the sealing jigs and form fins.

The second embodiment may be modified as follows.

The sealing section 311 may be formed only in a part of the circumference of the hollow plate 310. For example, the sealing section 311 may be formed only on one side or opposite two sides of the four sides of the periphery of the hollow plate 310. Further, instead of forming the sealing section 311 over the entire area of each side of the periphery of the hollow plate 310, the sealing section 311 may be formed only in a part of each side.

Depending on the degrees of heating of the sealing jigs and the compression of the periphery of the hollow plate 310 in the formation of the sealing section 311, there may be a case where cavities S3 are not formed in the sealing section 311.

During the periphery sealing process of the hollow plate 310, a molten resin pool may be formed in a region between the metal plates 350 and 360, for example between the edge 350a of the metal plate 350 and the edge 360a of the metal plate 360. The resin pool, after solidified, supports the metal plates 350 and 360 from the middle in the thickness direction of the hollow plate 310, thereby improving the overall impact strength of the lamination structure. Such a resin pool is formed when the molten resin adheres to side walls 323 of the core layer 320.

The sealing section 311 of the hollow plate 310 may be omitted. In this case, the edge of the core layer 320 and the edges of the superficial layers 330 and 340 form the edge of the hollow plate 310. As long as the edges 350a and 360a of the metal plates 350 and 360 are located inward of the edges of the core layer 320 and the superficial layers 330 and 340 in the plane direction of the hollow plate 310, any contact between the metal plate 350 or 360, which is relatively strong, and an object is less likely to leave scratches in the object.

The sealing section 311 of the hollow plate 310 may be formed by sandwiching and compressing the periphery of the hollow plate 310 with a pair of press plates from opposite sides in the thickness direction. In this case, the sealing section 311 is thinner than the core layer 320 of the hollow plate 310. Any structure may be employed as long as the internal cavities of the cells S in the core layer 320 are not exposed to the outside.

The cross-sectional shape of the sealing section 311 may be modified as needed. For example, when the groove 381 of each short-side sealing jig 380 has an arcuate cross-section, the sealing section 311 will also have an arcuate cross-section. The same applies to the long-side sealing jigs 390. In this case, the hollow plate 310 (sealing section 311) does not include the flat surfaces 311b, and the arcuate surfaces function as the inclined surfaces 311c. In other embodiments, the hollow plate 310 (sealing section 311) does not include the flat surfaces 311b and only includes the inclined surfaces 311c. Further, one or both of the two inclined surfaces 311c of the sealing section 311 may be omitted. In this case, the flat surfaces 311b of the sealing section 311 are at an angle of about 90° to the end surface 311a.

The plane shape of the hollow plate 310 may be a polygonal shape other than rectangular shape, a circular shape, or a shape in which curves and straight lines are combined. If the hollow plate 310 has an arcuate edge, sealing jigs may be used that are arcuate conforming to the shape of the edge of the hollow plate 310.

Depending on various conditions in the periphery sealing process, the inner edge section of the sealing section 311 may cover the edges 350a and 360a of the metal plates 350 and 360. For example, referring to FIG. 6C, if the sealing section 311 is formed with part of molten resin spreading into between the upper tapered surface 385 and the metal plate 350, the inner edge of the sealing section 311 protrudes over the metal plate 350 and covers the edge 350a of the metal plate 350. The same applies to the metal plate 360.

The periphery sealing process of the hollow plate 310 does not have to be performed simultaneously on the four sides of the hollow plate 310. For example, the sealing section 311 may first be formed on the two short sides of the hollow plate 310 and then formed on the two long sides. In this case, the short-side sealing jigs 380 do not interfere with the long-side sealing jigs 390. This allows the inclined sections 380a of the short-side sealing jigs 380 and the inclined sections 390a of the long-side sealing jigs 390 to be omitted.

One sealing jig is used for each of the four sides of the hollow plate 310 to form the sealing section 311. However, the present invention is not limited to this structure. For example, a first sealing jig, which extends along the entire length of a short side and a part of a long side of the hollow plate 310, and a second sealing jig, which extends along the entire length of a long side and a part of a short side of the hollow plate 310, may be used to perform the formation process of the sealing section 311 multiple times at the four corners of the hollow plate 310. This neatly forms a sealing section 311 at the four corners of the hollow plate 310.

The notches 312 of the hollow plate 310 may be omitted. For example, if the degree of compression is reduced when compressing the periphery of the hollow plate 310 to form the sealing section 311, the amount of molten resin flowing into the four corners of the hollow plate 310 will be moderate. In this case, formation of fins or the like is already limited without forming the notches 312.

The sealing section 311 may be formed in the hollow plate 310 before bonding the metal plates 350 and 360 to the hollow plate 310.

The flat surfaces or inclined surfaces may be formed in the hollow plate 310 that does not include the sealing section 311. For example, in the modification shown in FIG. 7, a hollow plate 410 includes a flat surface 410b and an inclined surface 410c located outward of the edge 450a of a metal plate 450. The flat surface 410b is formed to have a predetermined width W from the edge 450a of the metal plate 450. The inclined surface 410c is located in the edge section outward of the flat surface 410b in the plane direction of the lamination structure. The inclined surface 410c extends in an arc shape toward the middle section in the thickness direction of the hollow plate 410. The upper inclined surface 410c is formed by curving the edge sections of the superficial layer 430 and upper walls 421 of the core layer 420 downward. Similarly, a flat surface 410b and an inclined surface 410c are formed on the lower side of the hollow plate 410. The edge section in the circumference of the hollow plate 410 may be curved by pressing the edge section against the groove 381 of the short-side sealing jig 380 shown in FIGS. 6A to 6C, for example. In this case, the edges of the superficial layers 430 and 440 form the edge 410a of the hollow plate 410.

Figure 7:
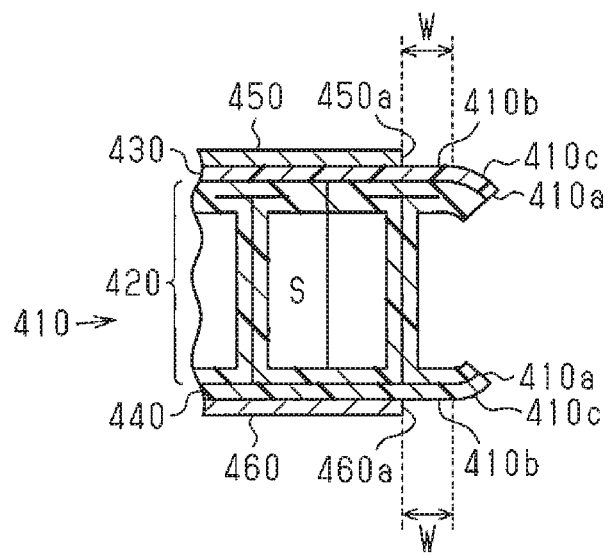
FIG. 7 is a cross-sectional view showing a lamination structure of a modification.
Figure 8:
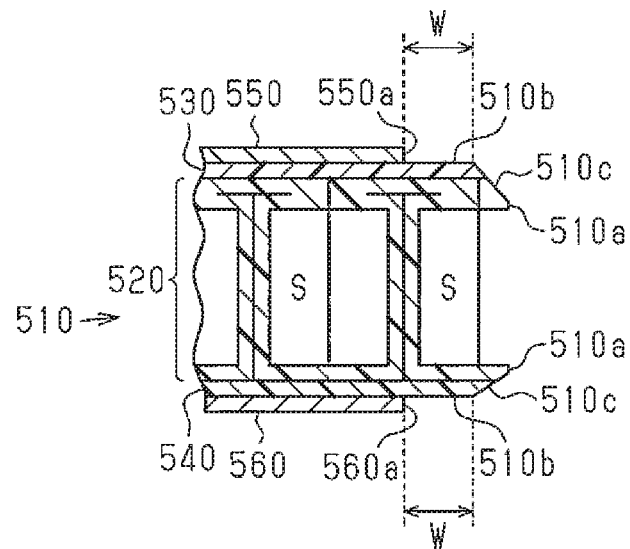
FIG. 8 is a cross-sectional view showing a lamination structure of a modification.

In the modification shown in FIG. 8, an upper flat surface 510b has a predetermined width W from an edge 550a of a metal plate 550 in the similar manner as the modification in FIG. 7. An inclined surface 510c is located in the edge section outward of the flat surface 510b in the plane direction of the lamination structure. The inclined surface 510c extends linearly toward the middle section in the thickness direction of the hollow plate 510. The inclined surface 510c is tapered such that the thickness of the hollow plate 510 decreases outward. Similarly, a flat surface 510b and an inclined surface 510c are formed on the lower side of the hollow plate 510. The hollow plate 510 may be tapered by machining the hollow plate 510 or by pressing the hollow plate 510 with a hot plate to partly melt the hollow plate 510, for example. In this case, the edge of the core layer 520 forms the edge 510a of the hollow plate 510.

In the modifications shown in FIGS. 7 and 8, the section of the hollow plate 410, 510 that is located outward of the metal plates 450, 550 and 460, 560 and thus not covered by the metal plates 450, 550 and 460, 560 has a relatively low strength. Thus, to maintain the strength of the lamination structure, it is preferable that the section of the hollow plate 410, 510 that is located outward of the metal plates 450, 550 and 460, 560 be narrower. However, when the section of the hollow plate 410, 510 outward of the metal plates 450, 550 and 460, 560 is excessively narrow, the edges 450a, 550a and 460a, 560a of the metal plates 450, 550 and 460, 560 are located near the edge 410a, 510a of the hollow plate 410, 510. To reduce impact applied to an object by the edges 450a, 550a and 460a, 560a of the metal plates 450, 550 and 460, 560, it is preferable that the section of the hollow plate 410, 510 outward of the metal plates 450, 550 and 460, 560 be wider. In view of the above, the width of the section of the hollow plate 410, 510 outward of the metal plates 450, 550 and 460, 560 is preferably 80% to 150% of the thickness of the plastic structure, and the width W of the flat surface 410b, 510b is preferably less than or equal to the thickness of the plastic structure.

In the modifications shown in FIGS. 7 and 8, when the inclined surfaces 410c, 510c of the hollow plate 410, 510 are formed by pressing a heated jig, part of molten resin may protrude over or cover the edges 450a, 550a and 460a, 560a of the metal plates 450, 550 and 460, 560.

The lamination structure may be used for any applications, such as a plate for containers or cases for distribution/transportation or a plate for constructions, scaffolding, furniture like shelves or tables, vehicle cargo cover, or vehicle luggage board, for example. Further, the lamination structure may be used as a core material, and a covering material may be placed over the outer surface of the lamination structure.

Third Embodiment

Referring to FIGS. 9 to 13C, a third embodiment of a lamination structure and a method for manufacturing the same according to the present invention will now be described. The components of the third embodiment that are the same as the corresponding components of the foregoing embodiments will not be described in detail.

Figure 9:
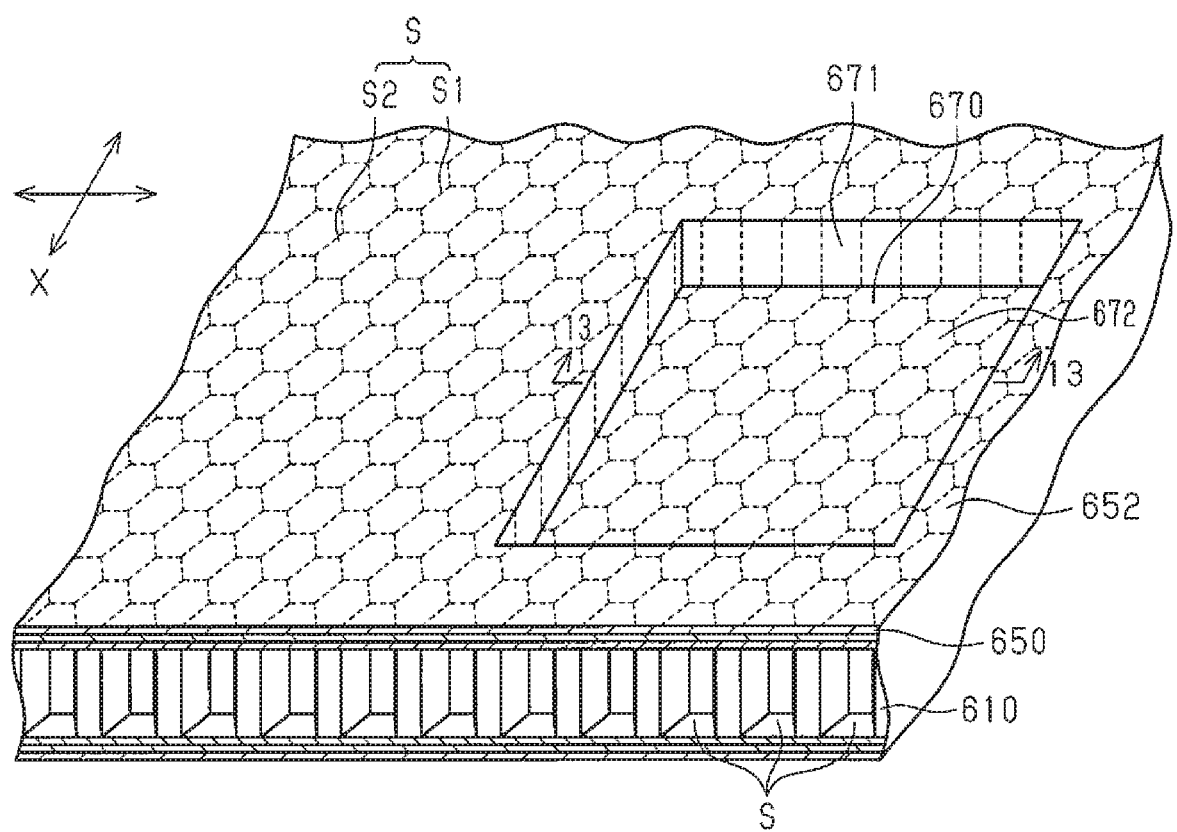
FIG. 9 is a perspective view showing a lamination structure according to a third embodiment of the present invention.

As shown in FIG. 9, the upper surface of a lamination structure, that is, the upper surface of an upper metal plate 650, includes a recess 670. The recess 670 is rectangular as viewed from above. The recess 670 includes four side walls 671, which extend downward from a surface 652 of the upper metal plate 650, and a rectangular base wall 672, which is surrounded by the side walls 671. The side walls 671 are substantially at a right angle to the surface 652 of the upper metal plate 650, and the base wall 672 is substantially at a right angle to the side walls 671.

Figure 10A:
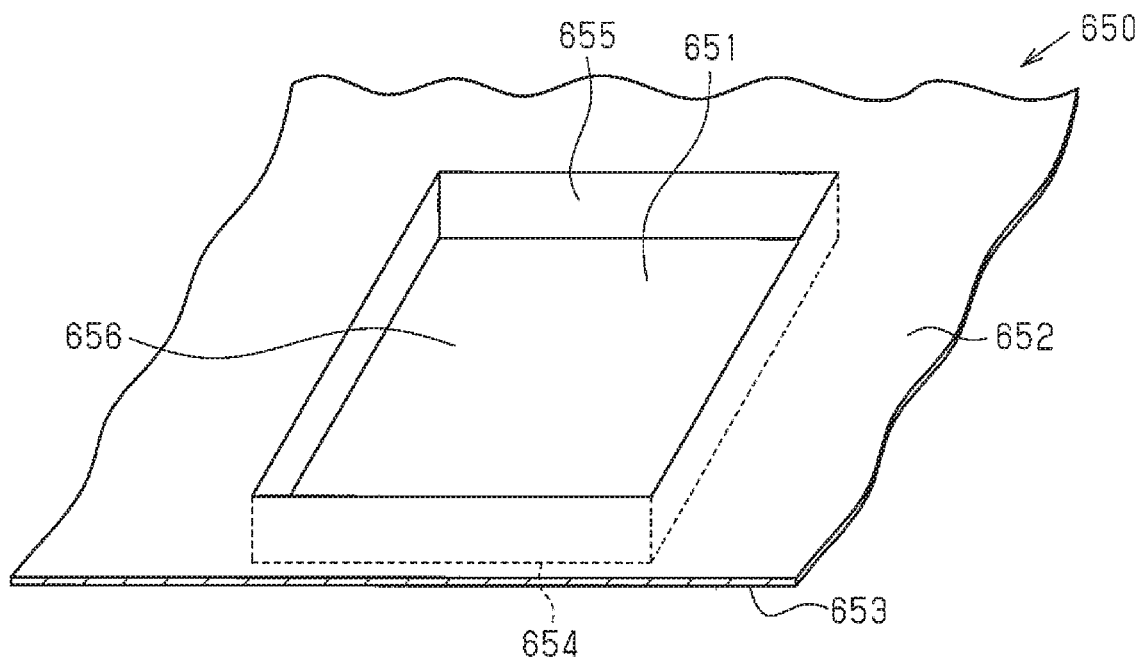
FIG. 10A is a partial perspective view showing an upper metal plate.

As shown in FIG. 10A, the upper metal plate 650 includes a metal recess 651. The metal recess 651 includes four side walls 655, which extend downward from the upper surface 652 of the upper metal plate 650, and a rectangular base wall 656, which is surrounded by the side walls 655. The upper metal plate 650 is a thin plate having a thickness of 0.05 mm to several mm. A metal protrusion 654, which corresponds to the metal recess 651, protrudes downward from the lower surface 653 of the upper metal plate 650.

Figure 10B:
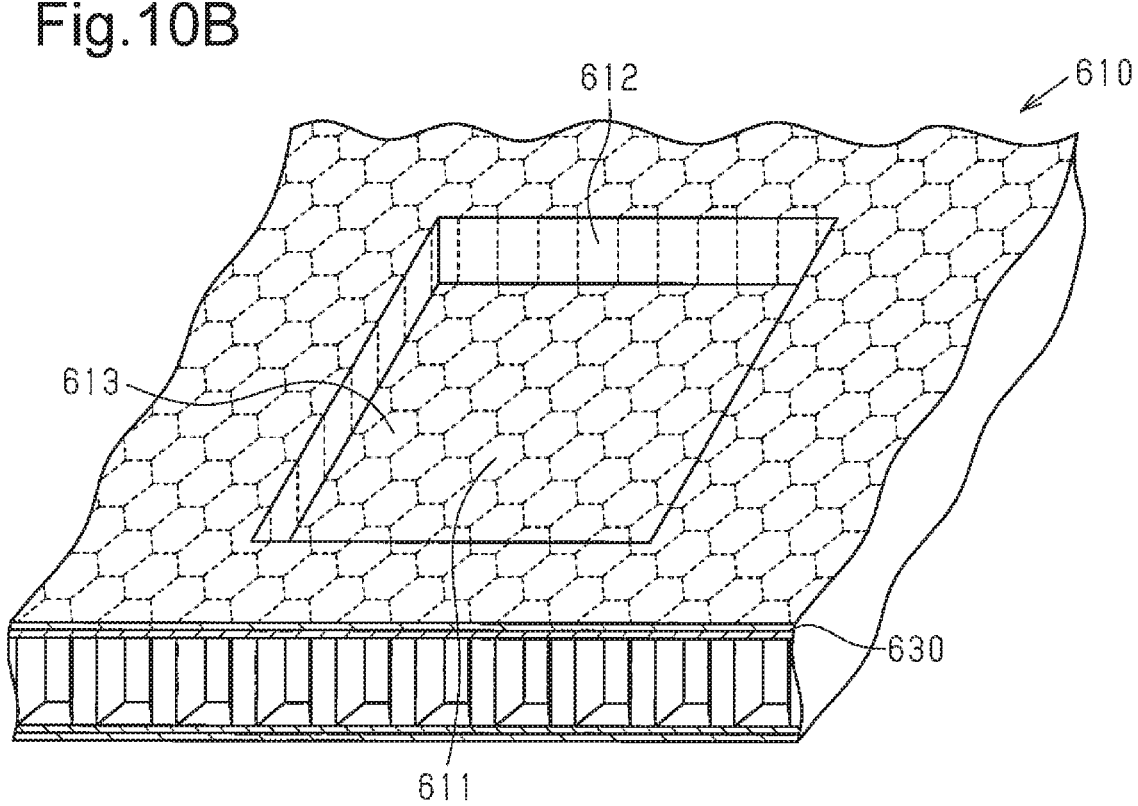
FIG. 10B is a partial perspective view showing a hollow plate.

As shown in FIG. 10B, a hollow plate 610 includes a plastic recess 611, where the hollow plate 610 is thermally deformed to be thinner. The plastic recess 611 includes four side walls 612, which extend downward from the surface of a superficial layer 630, and a rectangular base wall 613, which is surrounded by the side walls 612. The section of the hollow plate 610 located under the base wall 613 has a thickness of 2 to 15 mm. The thickness of this section is preferably less than or equal to one-half or one-third of the overall thickness of the hollow plate 610.

The back side of the metal recess 651 of the upper metal plate 650 is bonded to the plastic recess 611 of the hollow plate 610. That is, the surface of the metal protrusion 654 of the upper metal plate 650 is bonded to the plastic recess 611 of the hollow plate 610. Specifically, the side walls 655 of the metal recess 651 (metal protrusion 654) are bonded to the side walls 612 of the plastic recess 611, and the base wall 656 of the metal recess 651 (metal protrusion 654) is bonded to the base wall 613 of the plastic recess 611. The plastic recess 611 of the hollow plate 610 and the metal recess 651 of the upper metal plate 650 form the recess 670 of the lamination structure.

Referring to FIGS. 11A to 12I, a method for manufacturing a lamination structure according to the third embodiment will now be described. The method for manufacturing the hollow plate 610 is the same as that of the first embodiment and will not be described in detail. A method for manufacturing a lamination structure having a recess 670 by bonding metal plates 650 and 660 to the upper and lower sides of a hollow plate 610 will now be described.

Figure 11A:
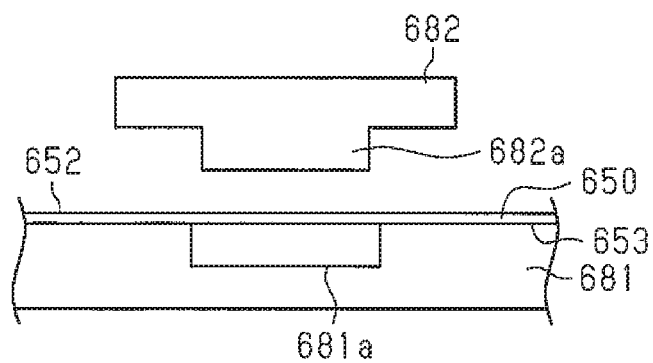
FIGS. 11A and 11B are diagrams showing a method for forming a metal recess in a metal plate.
Figure 11B:
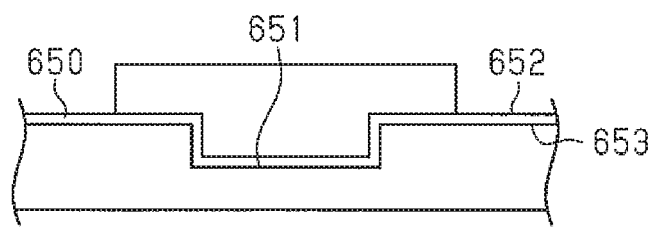
Figure 11C:
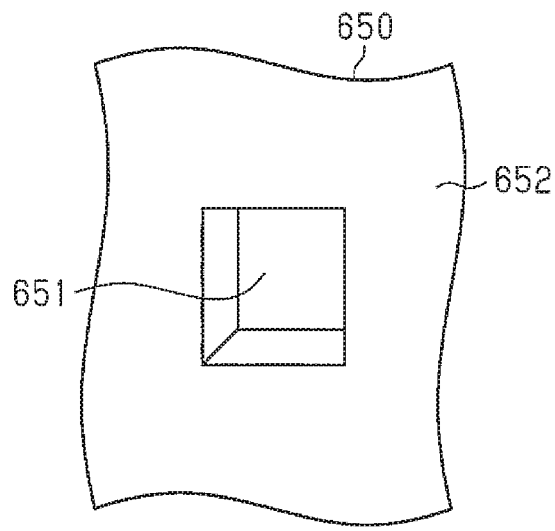
FIG. 11C is a partial perspective view showing the metal plate including the metal recess.
Figure 11D:
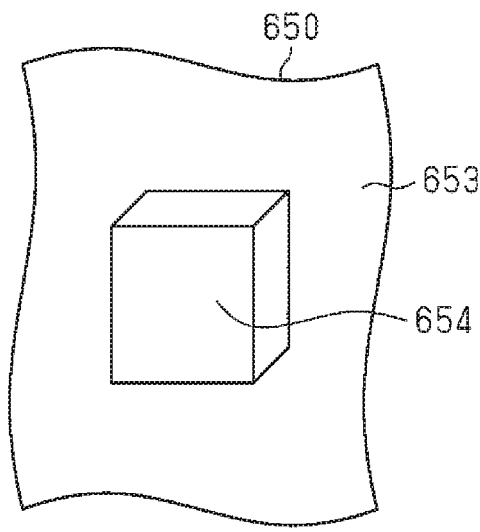
FIG. 11D is a partial perspective view showing the back side of the metal plate including the metal recess.

As shown in FIGS. 11A and 11B, an upper metal plate 650 is first stamped to form a metal recess 651. The upper metal plate 650 is placed on a lower die 681 such that a surface 653 faces downward. The lower die 681 includes a recess 681a having the same shape as the metal recess 651. Then, an upper die 682, which includes a protrusion 682a having the same shape as the metal recess 651, is moved toward the lower die 681. This forms the metal recess 651 in a surface 652 of the upper metal plate 650 as shown in FIG. 11C. In addition, a metal protrusion 654, which has the same shape as the metal recess 651, is formed in the surface 653 of the upper metal plate 650 as shown in FIG. 11D. The metal recess 651 and the metal protrusion 654 are formed by stamping the thin upper metal plate 650 and thus form opposite sides of one section.

Then, as shown in FIG. 12A, the stamped upper metal plate 650 is placed on one side in the thickness direction (first surface) of a flat support plate 6210, and a lower metal plate 660 is placed on the other side in the thickness direction (second surface) of the support plate 6210. Here, the surface 653 of the upper metal plate 650 from which the metal protrusion 654 protrudes faces toward the lower metal plate 660. The support plate 6210 includes a recess, which is slightly larger than the metal protrusion 654, in the position corresponding to the metal protrusion 654 of the upper metal plate 650. The recess of the support plate 6210 receives the metal protrusion 654 of the upper metal plate 650. Thus, the metal protrusion 654 of the upper metal plate 650 does not interfere with the support plate 6210 when placed on the first surface of the support plate 6210, and the surface 653 of the upper metal plate 650 is in planar contact with the entire first surface of the support plate 6210. FIG. 12A shows the surface 652 of the upper metal plate 650. Thus, the metal recess 651 of the upper metal plate 650 is shown in FIG. 12A.

The first and second surfaces of the support plate 6210 each include a plurality of air suction holes. The first and second surfaces of the support plate 6210 attract and support the metal plates 650 and 660 when air is drawn through the air suction holes in the support plate 6210.

Then, as shown in FIG. 12B, the support plate 6210, on which the metal plates 650 and 660 are supported, is placed between two heating plates 6220 and 6230. The heating plate 6220, which faces the upper metal plate 650, includes a protrusion 6221 in the position corresponding to the metal recess 651 in the surface 652 of the upper metal plate 650. The protrusion 6221 extends towards the upper metal plate 650 and has a shape that conforms to the inner shape of the metal recess 651. The plane shape of the heating plates 6220 and 6230, which function as heating members, is larger than or equal to the plane shape of the metal plates 650 and 660. In FIGS. 12A to 12I, the heating plates 6220 and 6230 and the metal plates 650 and 660 are shown as the same size.

The opposed surfaces of the heating plates 6220 and 6230 are heated to a temperature that is higher than or equal to the melting temperature of the thermoplastic resin forming a hollow plate 610. The opposed surfaces of the heating plates 6220 and 6230 include a plurality of air suction holes. The opposed surfaces of the heating plates 6220 and 6230 attract and support the metal plates 650 and 660 when air is drawn through the air suction holes in the heating plates 6220 and 6230.

After placing the support plate 6210, on which the metal plates 650 and 660 are supported, between the two heating plates 6220 and 6230, the two heating plates 6220 and 6230 are moved toward each other as shown in FIG. 12C. As indicated by the arrow in FIG. 12C, the two heating plates 6220 and 6230 sandwich the support plate 6210 on which the upper and lower metal plates 650 and 660 are supported. In this state, the entire surfaces of the metal plates 650 and 660 are in planar contact with the opposed surfaces of the heating plates 6220 and 6230 and therefore heated by the heat of the heating plates 6220 and 6230. In addition, the protrusion 6221 of the heating plate 6220 facing the upper metal plate 650 is placed in the metal recess 651 of the upper metal plate 650 so that the outer surface of the protrusion 6221 is in contact with the inner surface defining the metal recess 651. As such, the metal recess 651 (metal protrusion 654) of the upper metal plate 650 is heated by the heat of the protrusion 6221 of the heating plate 6220.

In this state, at least one of the air suction through the support plate 6210 and the air suction through the heating plates 6220 and 6230 is performed. Thus, the metal plates 650 and 660 are supported by the support plate 6210 and/or the heating plates 6220 and 6230 and thus held between the support plate 6210 and the heating plates 6220 and 6230.

Then, as shown in FIG. 12D, the heating plates 6220 and 6230, on which the metal plates 650 and 660 are supported, are moved away from each other. The support plate 6210 is then moved in the direction of the arrow in FIG. 12D away from between the two heating plates 6220 and 6230. After moving the support plate 6210, the hollow plate 610 is placed between the two heating plates 6220 and 6230 as shown in FIG. 12E. In this state, the metal plates 650 and 660, which are in planar contact with the opposed surfaces of the two heating plates 6220 and 6230, face the outer surfaces of the hollow plate 610. Further, the surface 653 of the upper metal plate 650 faces the hollow plate 610, and the metal protrusion 654 of the surface 653 faces the hollow plate 610.

After placing the hollow plate 610 between the two heating plates 6220 and 6230, as shown in FIG. 12F, the two heating plates 6220 and 6230 are moved toward each other. This moves the heating plates 6220 and 6230 toward the hollow plate 610 and brings the heated metal plates 650 and 660, which are supported by respective heating plates 6220 and 6230, into planar contact with the outer surfaces of the hollow plate 610. Here, the metal plates 650 and 660, which are heated to a high temperature, are bonded to the outer surfaces of the hollow plate 610 through thermal fusion caused by their own heat.

The metal protrusion 654 in the surface 653 of the upper metal plate 650 presses the surface of the hollow plate 610 that faces the upper metal plate 650. The metal protrusion 654 of the upper metal plate 650 is heated to a high temperature as with the upper metal plate 650. Thus, cells S in the hollow plate 610 are compressed and deformed by the pressing force from the metal protrusion 654. In addition, the hollow plate 610, which is made of a thermoplastic resin, is heated and melted to form a plastic recess 611, and the metal protrusion 654 (metal recess 651) of the upper metal plate 650 is bonded to the outer surface defining the plastic recess 611 by thermal fusion. This forms a recess 670 in the lamination structure.

After the metal plates 650 and 660 are brought into planar contact with the outer surfaces of the hollow plate 610, the air suction through the heating plates 6220 and 6230 is stopped, and the heating plates 6220 and 6230 are moved away from each other. In this process, the heating plates 6220 and 6230 sandwich the hollow plate 610 through the metal plates 650 and 660 only for a very short time. Thus, the heat of the heating plates 6220 and 6230 is not transferred excessively to the hollow plate 610. This limits excessive softening of the core layer 620 of the hollow plate 610, thereby limiting strength reduction of the hollow plate 610.

After bonding the metal plates 650 and 660 to the outer surfaces of the hollow plate 610 by thermal fusion, as shown in FIG. 12G, the hollow plate 610, which is placed between the two heating plates 6220 and 6230, is moved to be placed between two press plates 6240. The plane shape of the press plates 6240 is larger than or equal to the plane shape of the metal plates 650 and 660. In FIGS. 12A to 12I, the press plates 6240 and the metal plates 650 and 660 are shown as the same size. Unlike the two heating plates 6220 and 6230, the press plates 6240 are not heated and have ordinary temperature. The press plate 6240 facing the upper metal plate 650 and the press plate 6240 facing the lower metal plate 660 are both flat and free from a recess or protrusion.

As shown in FIG. 12H, after placing the hollow plate 610 between the two press plates 6240, the press plates 6240 are moved toward each other. The two press plates 6240 sandwich and press the hollow plate 610 in the thickness direction with a predetermined pressure. The press plates 6240 press the entire areas of the metal plates 650 and 660 against the hollow plate 610. The metal plates 650 and 660 are pressed against and bonded to the hollow plate 610 under uniform pressure. This adjusts the thickness of the lamination structure and forms a flat planar lamination structure that is free from warpage. Then, the two press plates 6240 are moved away from each other. As shown in FIG. 12I, the hollow plate 610 to which the two metal plates 650 and 660 are bonded by thermal fusion, or the lamination structure including the recess 670, is then moved away from between the two press plates 6240.

Operation of the third embodiment will now be described.

The upper metal plate 650 having the metal recess 651 (metal protrusion 654) is preheated and then bonded to the hollow plate 610 by thermal fusion. Pressing the hollow plate 610 with the metal protrusion 654 of the heated upper metal plate 650 compresses and deforms the hollow plate 610 with the pressing force from the metal protrusion 654. In addition, the metal protrusion 654 thermally melts the hollow plate 610, which is made of a thermoplastic resin, by its own heat and forms the plastic recess 611. Further, the metal recess 651 (metal protrusion 654) of the upper metal plate 650 is bonded to the hollow plate 610 to form the recess 670 of the lamination structure.

Instead of forming the metal recess 651 (metal protrusion 654) in the upper metal plate 650 in advance, a flat upper metal plate 650 could be bonded to the hollow plate 610. In this case, after forming the lamination structure, the lamination structure may be stamped by pressing the outer surface of the upper metal plate 650 with a recessed jig to form a recess in the surface of the lamination structure. However, in this method, the pressing force of the jig acts not only on the upper metal plate 650 but also on the hollow plate 610. This hinders controlling of the depth of the recess 670. In addition, due to the limited flexibility of the metal plate, the upper metal plate 650 may crack when a deep recess 670 is formed. In this respect, the third embodiment forms in advance the metal recess 651 (metal protrusion 654) in both sides of the upper metal plate 650 by stamping, and the heated upper metal plate 650 is bonded to the hollow plate 610 by thermal fusion. This avoids the problems described above. In addition, since the upper metal plate 650 that already has the metal recess 651 is used for thermal fusion, a recess 670 of 5 mm or more or even 10 mm or more may be formed. Further, the recess 670 may be formed with a steep angle, such as a right angle, between the side walls 671 and the base wall 672 of the recess 670. In other words, the recess 670 can be easily formed in a desired shape.

Figure 13A:
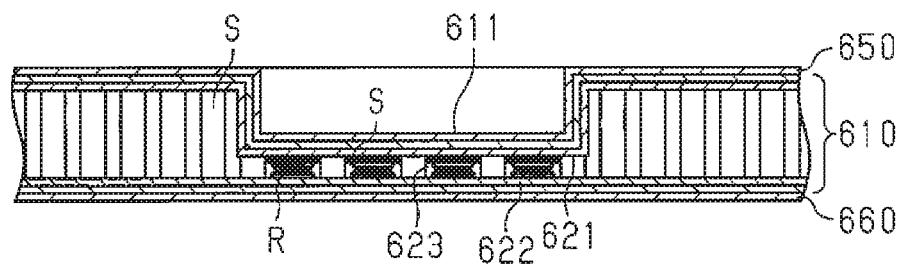
FIGS. 13A to 13C are cross-sectional views taken along line 13-13 in FIG. 9 each showing a state of a recess in a lamination structure.

When the upper metal plate 650 is heated to a relatively high temperature and pressed against the hollow plate 610 at reduced pressing speed, cells S are pressed equally while the thermoplastic resin melts in the section of the hollow plate 610 in which the plastic recess 611 is being formed. In this case, as shown in FIG. 13A, the thermoplastic resin forming the hollow plate 610 melts and forms molten resin pools in the cells S. At the same time, the distance between the upper walls 621 and the lower walls 622 becomes narrower with the side walls 623 of the cells S remain standing between the upper walls 621 and the lower walls 622. Consequently, the internal cavities of the cells S are narrowed, and solidified resin pools R are formed after the molten resin cools and hardens. This increases the strength of the thinner section. The term "solidified resin pool" in the appended claims refers to the state in which the thermoplastic resin forming the hollow plate 610 has melted and then cooled and hardened. The solidified resin pool R increases the strength of the recess 670 of the lamination structure.

Figure 13B:
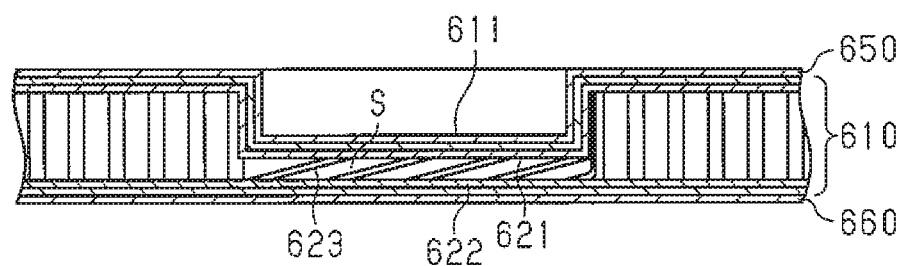

When the upper metal plate 650 is heated to a lower temperature and the pressing speed of the upper metal plate 650 is increased, the section of the hollow plate 610 in which the plastic recess 611 is being formed is compressed and deformed by the pressing force of the metal protrusion 654 while a lower amount of thermoplastic resin melts. In this case, as shown in FIG. 13B, the side walls 623 of the cells S collapse in the same direction between the upper walls 621 and the lower walls 622 while the distance between the upper walls 621 and the lower walls 622 becomes narrower. Accordingly, the solidified resin pools R and the compression of cells S, which is caused when the hollow plate 610 becomes thinner, improve the strength of the section under the recess 670 of the lamination structure.

Figure 13C:
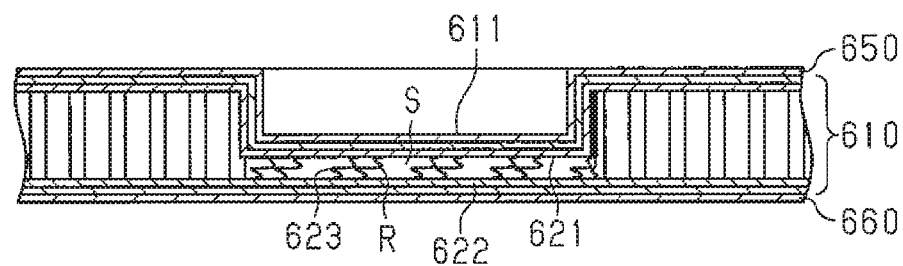

Alternatively, the heating temperature and the pressing speed of the upper metal plate 650 may be adjusted such that the side walls 623 of cells S collapse irregularly between the upper walls 621 and the lower walls 622 while the thermoplastic resin melts and forms resin pools in the cells S as shown in FIG. 13C. The molten resin cools and hardens to form solidified resin pools R, thereby improving the strength of the section where the thickness is reduced.

Adjusting the heating temperature and pressing speed of the upper metal plate 650 allows for modification of the state of cells S under the plastic recess 611 and adjustment of the strength of the section under the recess 670 in the lamination structure. The conditions may be set in view of the efficiency in the manufacturing process of the lamination structure and the properties required for the intended product.

(13) The hollow plate 610 of the lamination structure includes the plastic recess 611, which is thermally deformed by the metal recess 651 (metal protrusion 654) of the upper metal plate 650. The metal recess 651 of the upper metal plate 650 is bonded to the plastic recess 611. A given component may be coupled to the section of the lamination structure to which the metal recess 651 is bonded. For example, a holder or hook may be coupled to the metal recess 651. This allows the lamination structure to be used as a vehicle cargo cover. That is, coupling a given component to the recess 670 of the lamination structure increases the usability of the lamination structure.

To couple a given component to the lamination structure, the depth of the recess 670 may be set such that the component coupled to the lamination structure is received in the recess 670 without protruding out of the surface of the lamination structure. Such a lamination structure can be used as a vehicle part such as a luggage board that is less likely to damage the luggage placed on the luggage board. The lamination structure thus has functions that are desirable for a vehicle part.

(14) The heating plate 6220 for the upper metal plate 650 includes the protrusion 6221 shaped to conform to the inner shape of the metal recess 651 of the upper metal plate 650. The heat of the heating plate 6220 is thus easily transferred to the metal recess 651 of the upper metal plate 650. This facilitates the compression deformation and thermal fusion of the hollow plate 610 by the metal protrusion 654 of the upper metal plate 650. In addition, the section of the heating plate 6220 other than the protrusion 6221 is brought into planar contact with the upper metal plate 650 and thus evenly heats the upper metal plate 650, allowing the upper metal plate 650 to be bonded uniformly to the outer surface of the hollow plate 610 by thermal fusion.

The third embodiment may be modified as follows.

The side walls 671 do not have to be at about right angle with respect to the plane including the base wall 672 and may be at 5° to 90°, 20° to 90°, or 45° to 90°. A reduced angle between the side walls 671 and the plane including the base wall 672 forms the recess 670 in the surface of the lamination structure with less steepness. An increased angle between the side walls 671 and the plane including the base wall 672 improves the bending strength of the section under the recess 670, thereby improving the strength of the lamination structure. That is, the angle may be set as appropriate depending on the function or usability required for the lamination structure.

At least one of the side walls 671 and the base wall 672 may be concave, convex, or curved to form an S-shaped cross section. In this case, the angle between the side walls 671 and the base wall 672 may be determined by approximating the uneven surface to an even surface.

The upper metal plates 650 may be formed by a plurality of plates. In this case, the metal protrusion 654 may be formed of a plate that differs from the plate forming the other section, and the other section may be formed by a plurality of plates. The plates may differ in thickness, material, or the like. This may improve the bending strength and reduce the weight of the lamination structure. The same applies to the lower metal plate 660.

When bonding the metal plates 650 and 660 to the hollow plate 610, a step may be added to remove air the in hollow plate 610. Air can be trapped in the hollow plate 610 when bonding the superficial layers 630 and 640 to the core layer 620. The air in the hollow plate 610 may contract after the metal plates 650 and 660 are bonded, bending the metal plates 650 and 660 inward. When the metal plates 650 and 660 are bonded and the section under the plastic recess 611 becomes thinner, the compressed air in the hollow plate 610 may bend the metal plates 650 and 660 outward. Process of removing air lessens the likelihood of the metal plates 650 and 660 bending upward or downward.

One or both of the superficial layers 630 and 640 of the hollow plate 610 may be omitted, and the metal plates 650 and 660 may be bonded to the core layer 620 directly.

The thermoplastic resin that forms the hollow plate 610 may include a flame retardant resin, for example, to improve the flame redundancy. Further, talc or inorganic material may be added to increase the specific gravity. All or at least one of the core layer 620 and superficial layers 630 and 640 may include various functional resins.

The surface of the lamination structure that includes the upper metal plate 650 has only one recess 670. However, there is no limitation to the number of the recess 670, and a plurality of recesses 670 may be formed. A plurality of recesses 670 may be formed in both sides of the lamination structure, where the upper metal plate 650 and the lower metal plate 660 are located. Further, a plurality of recesses 670 may be formed over the entire metal plates 650 and 660 such that one or both of the surfaces of the lamination structure is corrugated. In this case, upper and lower dies may be used that include recesses and protrusions in the number corresponding to the number of recesses 670. Alternatively, a plurality of metal recesses may be formed by repeating stamping multiple times using upper and lower dies each having a single recess or protrusion.

Figure 14A:
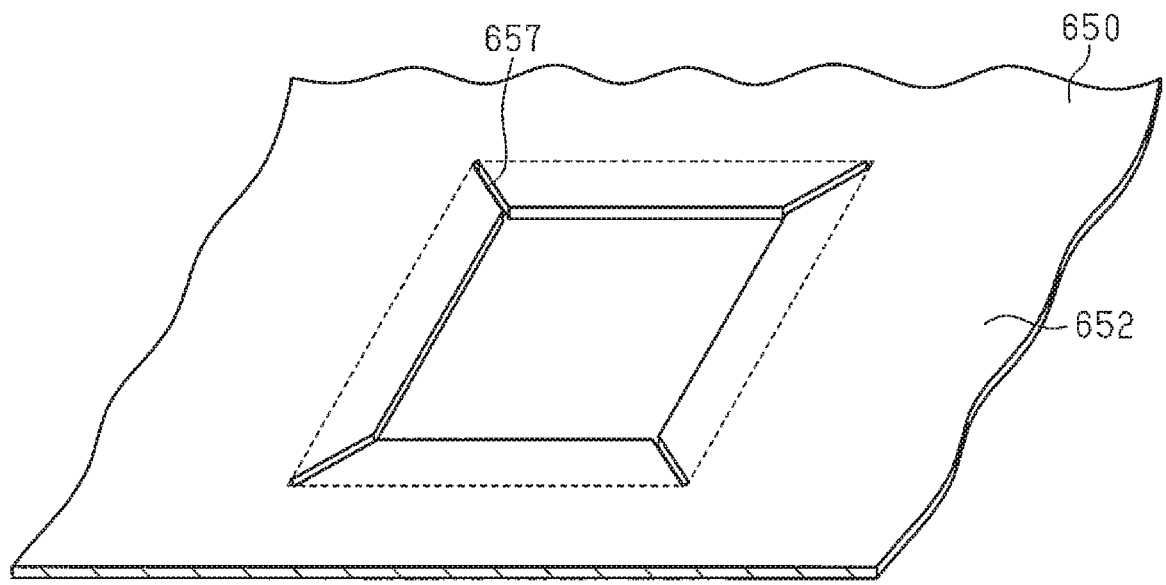
FIGS. 14A and 14B are diagrams showing a method for stamping a metal plate according to a modification.

Prior to stamping the upper metal plate, the section corresponding to the base wall of the metal recess may be stamped out, and the sections corresponding to the borders between the side walls may be cut to form slits. For example, as shown in FIGS. 14A and 14B, the rectangular section of the upper metal plate 650 corresponding to the base wall 656 of the metal recess 651 may be stamped out, and four cuts 657 may be formed in the borders between adjacent side walls 655 of the metal recess 651 in advance.

When stamping such an upper metal plate 650, a line connecting the four cuts 657 in the upper metal plate 650 (the dotted line in FIG. 14A) is aligned with the upper edge of the recess in the lower die, and the upper die is moved toward the lower die to stamp the upper metal plate 650. When bonding the metal plates 650 and 660 by thermal fusion, the protrusion 6221 of the heating plates 6220 or 6230 is pressed against the hollow plate 610. This forms the plastic recess 611 in the hollow plate 610 and thus a lamination structure including the recess 670.

Figure 14B:
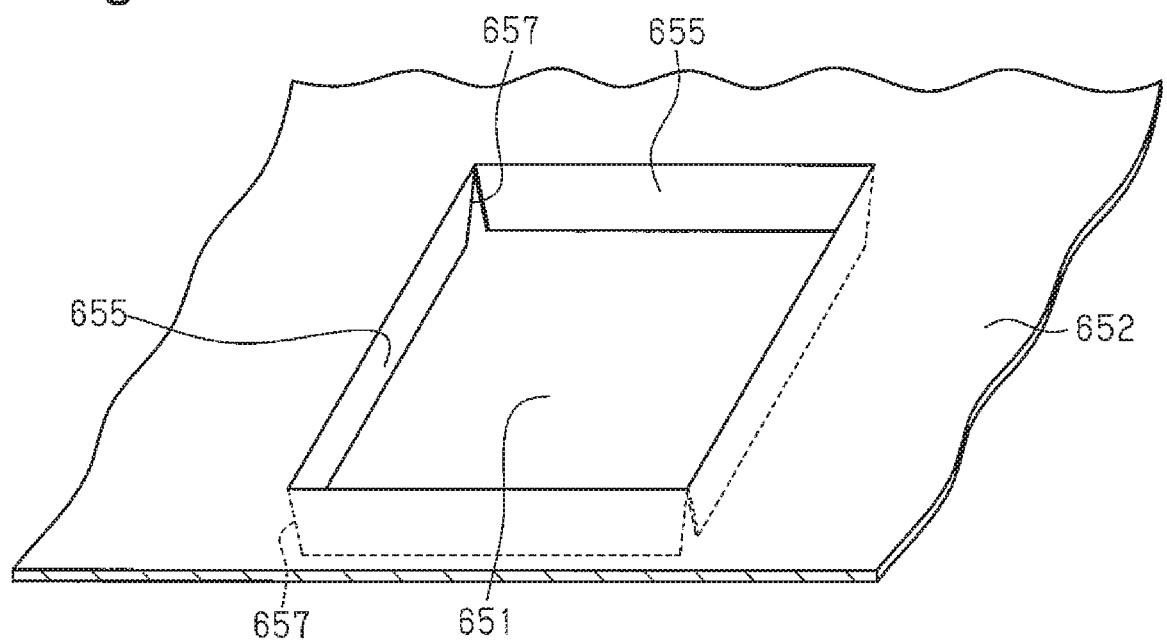

Such preprocessing of the upper metal plate 650 facilitates deformation of the side walls 655 when stamping the upper metal plate 650 as shown in FIG. 14B. This limits cracking of the upper metal plate 650 even when a deep metal recess 651 is formed. The appearance of the recess 670 in the lamination structure is thus improved.

The cuts 657 are not limited to slits and may be wider and trapezoidal. When stamping the upper metal plate 650, the rectangular section corresponding to the base wall 672 and the cuts 657 may be stamped out simultaneously. Further, the rectangular section and the cuts 657 may be formed simultaneously with the side walls 655 of the metal recess 651.

Figure 15A:
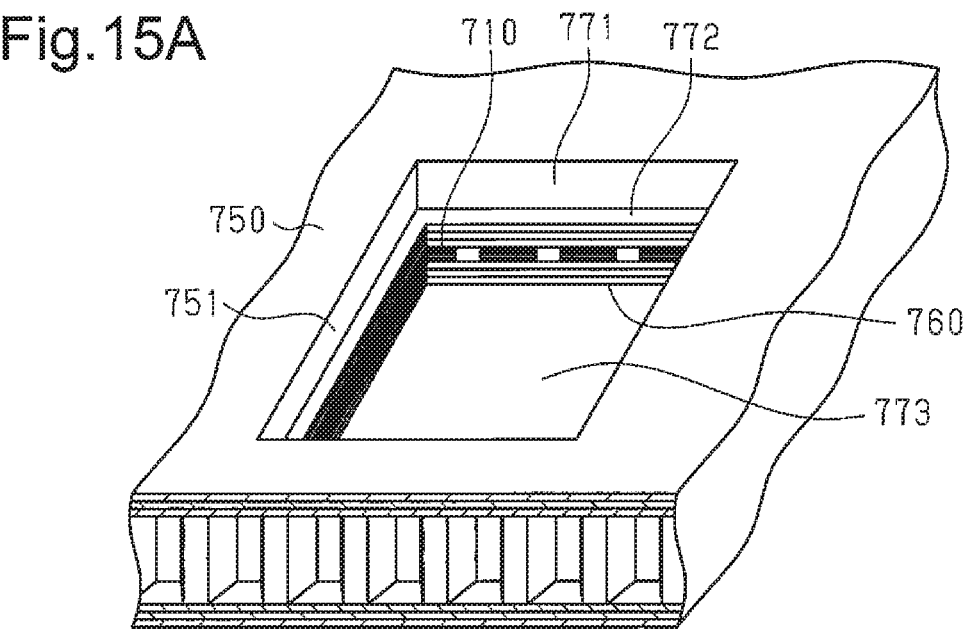
FIG. 15A is a partial perspective view showing a modification of a recess in a lamination structure.

As shown in FIG. 15A, a recess 770 may include an base wall 772 that includes a hole 773 extending through a lower metal plate 760. That is, a metal recess 751 of an upper metal plate 750 may include a hole, and a plastic recess 711 of a hollow plate 710 may include a hole. In this case, a component such as a holder or hook may be coupled to sandwich the base wall 772 of the recess 770. The metal plates 750 and 760 are bonded to the upper and lower sides of the base wall 772. This ensures the coupling of the component into the hole 773 even when the overlap allowance between the component and the base wall 772 is limited.

Figure 15B:
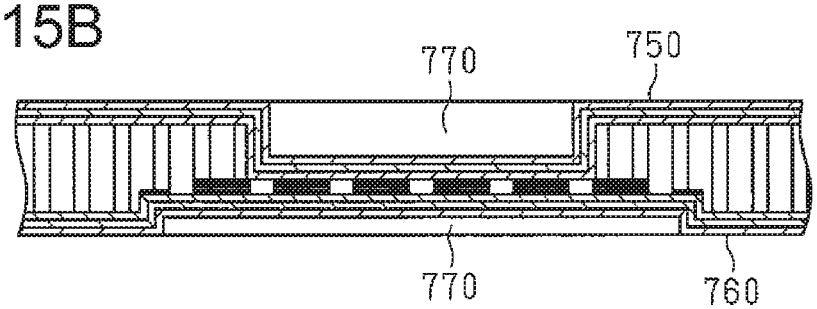
FIG. 15B is a cross-sectional view showing another modification of a recess in a lamination structure.

As shown in FIG. 15B, a recess 770 may be formed in the upper side of the lamination structure, where the upper metal plate 750 is located, and another recess 770 may be formed in the same position in the lower side, where the lower metal plate 760 is located. The recess 770 in the upper side may be identical to or different from the recess 770 in the lower side in size and shape. Further, as shown in FIG. 15A, a hole 773 may extend through both recesses 770.

Figure 15C:
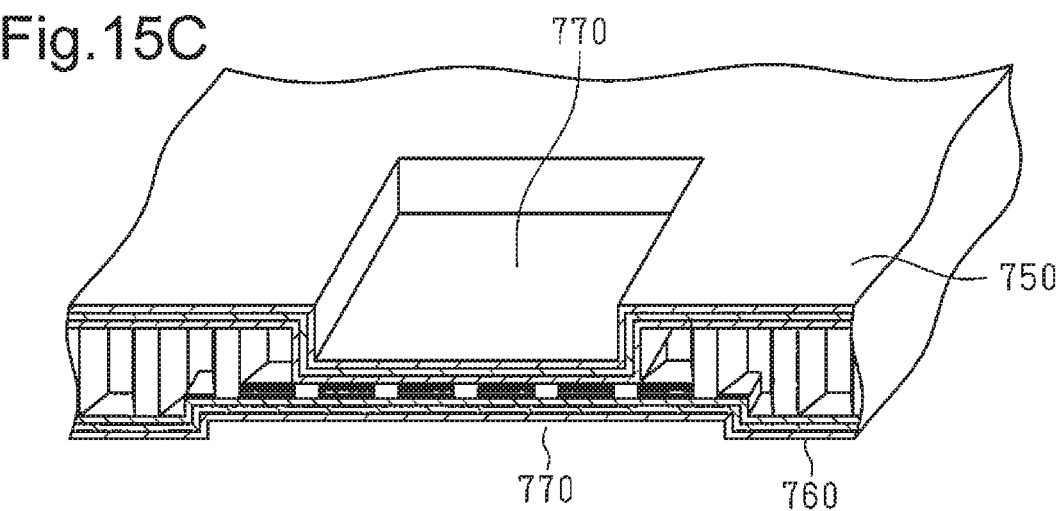
FIG. 15C is a partial perspective view showing another modification of a recess in a lamination structure.

As shown in FIG. 15C, a recess 770 may be formed in an end section of the lamination structure. In this case, a component such as holder or hook may be coupled to the end section of the lamination structure. Such a lamination structure may be used as a vehicle part such as a vehicle cargo cover that is opened and closed by pulling the end section. Further, as shown in FIG. 15A, the base wall 772 of the recess 770 may include a hole 773 extending through the lower metal plate 760. In FIG. 15C, the recess 770 is formed in each of the upper and lower metal plates 750 and 760. However, the recess 770 may be formed only in one of the metal plates 750 and 760.

The recess 770 may have any shape, such as a circular shape or irregular shape as viewed from above. The base wall 772 of the recess 770 may include an additional recess, and steps may be formed.

The recess 770 may be of any size, and the recess 770 may occupy most of the area of the upper metal plate 750. When the recess 770 occupies a greater area of the entire upper metal plate 750, the section other than the recess 770 is a projection of the upper metal plate 750. The section that is thermally deformed by the upper metal plate 750 and located lower than the projection forms the recess 770.

Figure 15D:
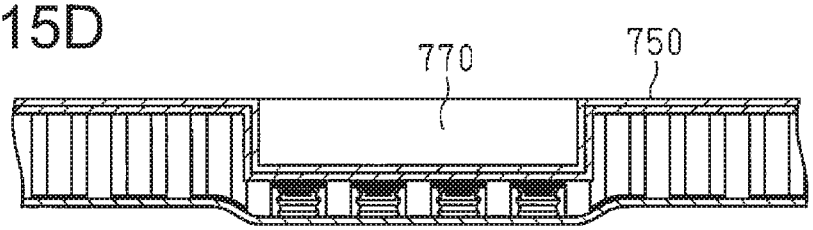
FIG. 15D is a cross-sectional view showing another modification of a recess in a lamination structure.

As shown in FIG. 15D, the upper metal plate 750 may be bonded only to the upper surface of the hollow plate 710 by thermal fusion. In this case, the side of the lamination structure where the upper metal plate 750 is bonded to the hollow plate 710 includes a recess 770 that is formed by the pressing force of the metal protrusion 754 (metal recess 751) and thermal fusion. On the side of the hollow plate 710 that is opposite to the upper metal plate 750, the section corresponding to the recess 770 bulges. In this case, the upper metal plate 750 and the plastic recess 711, where the hollow plate 710 is thermally deformed and thinner, improve the strength of the hollow plate 710. The usability of the lamination structure may be increased by coupling a component such as a holder or a hook to the recess 770. When bonding the upper metal plate 750, a support member may be positioned on the side of the hollow plate 710 opposite to the upper metal plate 750 to limit partial bulging of the hollow plate 710.

Figure 16A:
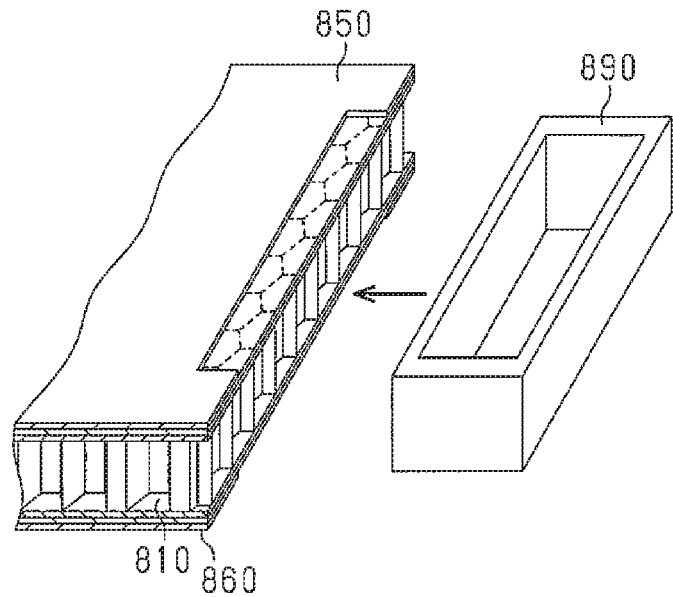
FIGS. 16A to 16D are partial perspective views showing other modifications of a recess in a lamination structure.
Figure 16B:
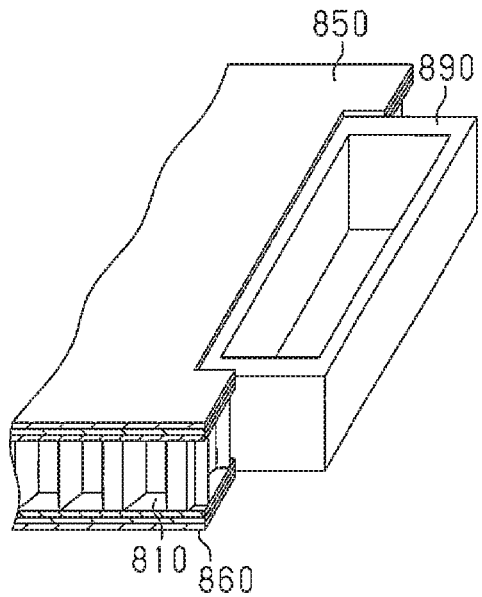

As shown in FIGS. 16A and 16B, metal plate 850 and 860 may be bonded to both sides of a hollow plate 810 excluding sections in one end. A metal looped holder 890, which is heated, may be moved sideways to the hollow plate 810 to heat and compress the hollow plate 810. This couples the holder 890 to the hollow plate 810. In this case, the holder 890 corresponds to the "metal component" in the appended claims, and the heated and compressed side section of the hollow plate 810 corresponds to the "plastic recess" in the appended claims.

Figure 16C:
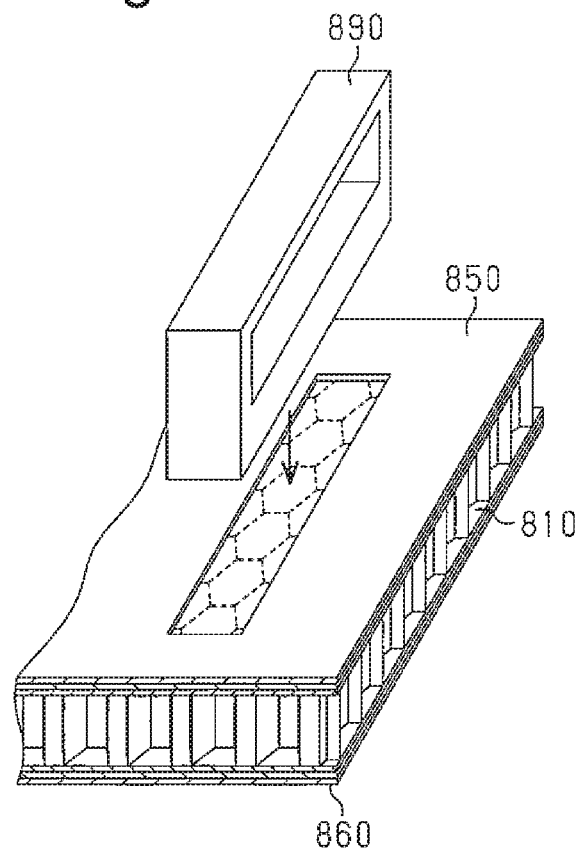
Figure 16D:
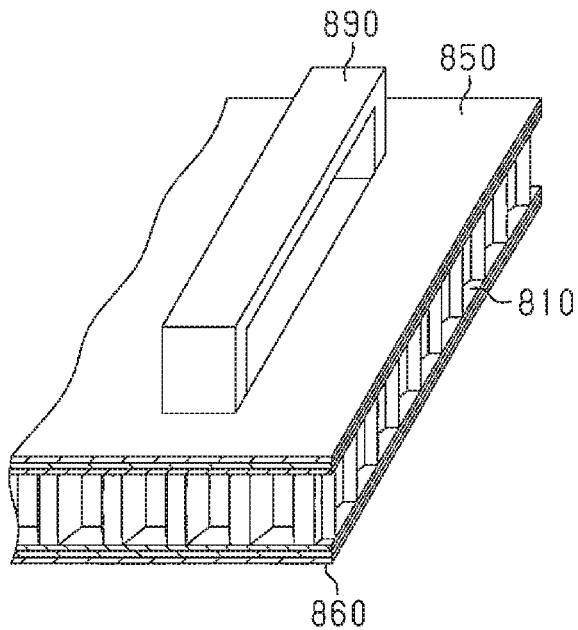

Alternatively, a metal plate 850 or 860 from which a section is removed may be bonded to the upper or lower side of the hollow plate 810, and a metal component may be bonded to the section of the hollow plate 810 to which the metal plate 850 or 860 is not bonded. For example, as shown in FIG. 16C, an upper metal plate 850 from which a section is removed may be bonded to the upper surface of the hollow plate 810, and a metal looped holder 890, which is heated, may be bonded to the section of the hollow plate 810 to which the upper metal plate 850 is not bonded. As shown in FIG. 16D, the bonded holder 890 protrudes outward from the upper metal plate 850 of the hollow plate 810.

We claim:
1. A lamination structure comprising a hollow plate that is made of a thermoplastic resin and includes a plurality of cells formed inside the hollow plate and a metal component that is bonded to the hollow plate, wherein:
the hollow plate includes a plastic recess that is thermally deformed by the metal component;
the metal component is bonded to the plastic recess; and
in the plastic recess, a solidified resin pool is formed in the hollow plate.

* * * * *